US012768288B2

(12) United States Patent
Xu et al.

(10) Patent No.: US 12,768,288 B2
(45) Date of Patent: Oct. 20, 2026

(54) OPEN ROTOR AIRCRAFT PROPULSION SYSTEM WITH GUIDE VANE STRUCTURE RECEPTACLE

(71) Applicant: RTX Corporation, Farmington, CT (US)

(72) Inventors: Jinquan Xu, East Greenwich, RI (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/960,465

(22) Filed: Nov. 26, 2024

(65) Prior Publication Data

US 2026/0146546 A1 May 28, 2026

(51) Int. Cl.

| | |
|---|---|
| ***F01D 25/24*** | (2006.01) |
| ***F01D 9/02*** | (2006.01) |
| ***F04D 19/00*** | (2006.01) |

(52) U.S. Cl.

CPC ............... *F01D 25/24* (2013.01); *F01D 9/02* (2013.01); *F04D 19/002* (2013.01); *F05D 2220/323* (2013.01); *F05D 2240/12* (2013.01); *F05D 2240/90* (2013.01)

(58) Field of Classification Search

CPC . F01D 25/24; F01D 25/28; F01D 9/00; F01D 9/02; F01D 9/04; F01D 9/041; F01D 9/042; F01D 9/044; F05D 2240/12; F05D 2240/90; F05D 2220/323; F04D 19/02

See application file for complete search history.

(56) References Cited

U.S. PATENT DOCUMENTS

| | | | | |
|---|---|---|---|---|
| 8,714,478 | B2 | 5/2014 | Mulcaire | |
| 8,943,796 | B2 | 2/2015 | Mccaffrey | |
| 9,481,470 | B2 | 11/2016 | West | |
| 10,556,699 | B2 | 2/2020 | Pautis | |
| 11,655,767 | B2 | 5/2023 | Hrubec | |
| 11,945,595 | B2 | 4/2024 | Stretton | |
| 12,421,864 | B2 | 9/2025 | Zutshi | |
| 2020/0141277 | A1 * | 5/2020 | Cooper | F01D 25/24 |
| 2020/0141313 | A1 * | 5/2020 | Cooper | F02K 99/00 |
| 2023/0021836 | A1 | 1/2023 | Riddle | |

(Continued)

FOREIGN PATENT DOCUMENTS

FR 3099138 B1 7/2021

OTHER PUBLICATIONS

EP Search Report for EP Patent Application No. 25218823.0 dated Apr. 16, 2026.

*Primary Examiner* — Elton K Wong
(74) *Attorney, Agent, or Firm* — Getz Balich LLC

(57) ABSTRACT

An aircraft propulsion system assembly includes an open propulsor rotor and a housing structure. The housing structure includes an engine case, a nacelle structure and a receptacle. The nacelle structure is disposed radially outboard of and partially covers an engine case. The nacelle structure forms a first axial section of an exterior flow boundary for the aircraft propulsion system that borders an environment external to the aircraft propulsion system. The receptacle is disposed radially outboard of the engine case and axially between the open propulsor rotor and the nacelle structure. The receptacle is configured to receive a structure base of an open guide vane structure.

17 Claims, 16 Drawing Sheets

(56) References Cited

U.S. PATENT DOCUMENTS

| | | | | |
|---|---|---|---|---|
| 2023/0271695 | A1 | 8/2023 | Charier | |
| 2023/0366325 | A1* | 11/2023 | Levisse | F01D 9/042 |
| 2024/0124147 | A1 | 4/2024 | Bowden | |
| 2024/0239502 | A1 | 7/2024 | Glemarec | |
| 2024/0270396 | A1* | 8/2024 | Beutin | F02C 7/36 |
| 2024/0344487 | A1 | 10/2024 | Ostdiek | |
| 2025/0215830 | A1 | 7/2025 | Glemarec | |

* cited by examiner

OPEN ROTOR AIRCRAFT PROPULSION SYSTEM WITH GUIDE VANE STRUCTURE RECEPTACLE

BACKGROUND OF THE DISCLOSURE

1. Technical Field

This disclosure relates generally to an aircraft and, more particularly, to an open rotor propulsion system for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, an assembly is provided for an aircraft propulsion system. This assembly includes an open propulsor rotor, a housing structure, a compressor section, a combustor section, a turbine section and a flowpath. The open propulsor rotor includes a plurality of open propulsor blades arranged circumferentially around an axis. Each of the open propulsor blades projects radially out into an environment external to the aircraft propulsion system. The housing structure includes an engine case, a nacelle structure and a receptacle. The nacelle structure is disposed radially outboard of and partially covers the engine case. The nacelle structure forms a first axial section of an exterior flow boundary for the aircraft propulsion system that borders the environment external to the aircraft propulsion system. The receptacle is disposed radially outboard of the engine case and axially between the open propulsor rotor and the nacelle structure. The receptacle is configured to receive a structure base of an open guide vane structure. The compressor section is housed within the engine case. The combustor section is housed within the engine case. The turbine section is housed within the engine case. The turbine section includes a turbine rotor operatively coupled to the open propulsor rotor. The turbine rotor is configured to drive rotation of the open propulsor rotor about the axis. The flowpath extends through the compressor section, the combustor section and the turbine section from an inlet into the flowpath to an exhaust from the flowpath.

According to another aspect of the present disclosure, another assembly is provided for an aircraft propulsion system. This assembly includes an open propulsor rotor, an open guide vane structure, a turbine engine and a pylon structure. The open guide vane structure is next to the open propulsor rotor. The turbine engine is configured to drive rotation of the open propulsor rotor about an axis. The turbine engine includes a flowpath, a compressor section, a combustor section and a turbine section. The flowpath extends through the compressor section, the combustor section and the turbine section from an inlet into the flowpath to an exhaust from the flowpath. The open guide vane structure is supported by the pylon structure independent of the turbine engine with the open guide vane structure mounted to or formed integral with the pylon structure. The turbine engine is mounted to the pylon structure.

According to another aspect of the present disclosure, another assembly is provided for an aircraft propulsion system. This assembly includes a structure base and a plurality of guide vanes projecting radially out from the structure base. The structure base extends circumferentially about an axis of the aircraft propulsion system. The structure base is configured to be housed in a receptacle of a housing structure of the aircraft propulsion system. The structure base includes a first structure section and a second structure section. The first structure section extends circumferentially about the axis between a first segment first end and a first segment second end. The second structure section extends circumferentially about the axis between a second segment first end and a second segment second end. The second segment first end is next to the first segment first end, and/or the second segment second end is next to the first segment second end. A first set of the guide vanes projects radially out of the first structure section. A second set of the guide vanes projects radially out of the second structure section.

According to still another aspect of the present disclosure, another assembly is provided for an aircraft propulsion system. This assembly includes an open propulsor rotor, a turbine engine and an open guide vane structure. The turbine engine is configured to drive rotation of the open propulsor rotor about an axis. The turbine engine includes a flowpath, a compressor section, a combustor section and a turbine section. The flowpath extends through the compressor section, the combustor section and the turbine section from an inlet into the flowpath to an exhaust from the flowpath. The open guide vane structure includes a structure base and a plurality of guide vanes. The structure base is radially outboard of and circumscribes the turbine engine. The structure base includes a plurality of structure segments arranged end-to-end circumferentially around the axis. The structure segments include a first structure segment and a second structure segment removably and/or movably attached to the first structure segment. A first set of one or more of the guide vanes is/are connected to and project radially out from the first structure segment. A second set of one or more of the guide vanes is/are connected to and project radially out from the second structure segment.

The structure base may be configured to form a second axial section of the exterior flow boundary that is flush with and axially adjacent to the first axial section of the exterior flow boundary.

The turbine engine may be mounted to the pylon structure independent of the open guide vane structure.

The housing structure may also include an inlet structure. An inner portion of the inlet structure may form an outer peripheral boundary of the inlet into the flowpath. An outer portion of the inlet structure may form a second axial section of the exterior flow boundary with the receptacle extending axially between the first axial section of the exterior flow boundary and the second axial section of the exterior flow boundary.

The assembly may also include the structure base. The structure base may also be configured to form a third axial section of the exterior flow boundary flush with and axially adjacent to the second axial section of the exterior flow boundary.

The assembly may also include a pylon structure. The engine case may be mounted to the pylon structure through a load path independent of the receptacle.

The assembly may also include the open guide vane structure, and the open guide vane structure may include the structure base and a plurality of open guide vanes. Each of the open guide vanes may project radially out from a portion of the structure base into the environment external to the aircraft propulsion system. The portion of the structure base may include a second axial section that is flush with and axially adjacent to the first axial section of the exterior flow boundary.

The assembly may also include a pylon structure and a turbine engine. The turbine engine may include the compressor section, the combustor section, the turbine section, the flowpath and the engine case. The open guide vane structure may be mounted to the pylon structure independent of the turbine engine.

The assembly may also include a pylon structure and a turbine engine. The turbine engine may include the compressor section, the combustor section, the turbine section, the flowpath and the engine case. The turbine engine may be mounted to the pylon structure independent of the open guide vane structure.

The assembly may also include a pylon structure and a turbine engine. The pylon structure may include at least a portion or an entirety of the structure base. The turbine engine may include the compressor section, the combustor section, the turbine section, the flowpath and the engine case. The turbine engine may be mounted to the pylon structure.

The assembly may also include the open guide vane structure. The open guide vane structure may include the structure base, one or more first open guide vanes and one or more second open guide vanes. The structure base may be disposed in the receptacle. The structure base may include a first structure segment and a second structure segment. The first structure segment may extend circumferentially about the axis between a first segment first end and a first segment second end. The second structure segment may extend circumferentially about the axis between a second segment first end and a second segment second end. The second segment first end may be next to the first segment first end. The second segment second end may be next to the first segment second end. The second structure segment may be removably attached to the first structure segment. The one or more first open guide vanes may be arranged circumferentially about the axis. Each of the one or more first open guide vanes may be connected to and project radially out from the first structure segment. The one or more second open guide vanes may be arranged circumferentially about the axis. Each of the one or more second open guide vanes may be connected to and project radially out from the second structure segment.

The assembly may also include a pylon structure connected to the first structure segment.

The second structure segment may extend between ninety degrees and three-hundred degrees circumferentially about the axis between the second segment first end and the second segment second end.

The assembly may also include the open guide vane structure. The open guide vane structure may also include the structure base, one or more first open guide vanes arranged circumferentially about the axis, and one or more second open guide vanes arranged circumferentially about the axis. The structure base may be disposed in the receptacle. The structure base may include a first structure segment and a second structure segment. The first structure segment may extend circumferentially about the axis to a first segment first end. The second structure segment may extend circumferentially about the axis. The second structure segment may be pivotally attached to the first structure segment at the first segment first end. Each of the one or more first open guide vanes may be connected to and project radially out from the first structure segment. Each of the one or more second open guide vanes may be connected to and project radially out from the second structure segment.

The open guide vane structure may also include one or more third open guide vanes arranged circumferentially about the axis. Each of the one or more third open guide vanes may be connected to and project radially out from a third structure segment. The first structure segment may extend circumferentially about the axis between the first segment first end and a first segment second end. The structure base may also include the third structure segment. The third structure segment may extend circumferentially about the axis. The third structure segment may be pivotally attached to the first structure segment at the first segment second end.

The third structure segment may be removably attached to the second structure segment at a joint between the third structure segment and the second structure segment.

The one or more first open guide vanes may include a first open guide vane pivotable about a first pivot axis. The first open guide vane may be configured to pivot to a first access position to facilitate opening of the second structure segment from a stowed position to an open position. The one or more second open guide vanes may include a second open guide vane pivotable about a second pivot axis and circumferentially neighboring the first open guide vane. The second open guide vane may be configured to pivot to a second access position to facilitate opening of the second structure segment from the stowed position to the open position.

The assembly may also include a turbine engine, an engine controller, the open guide vane structure, a vane actuation system and a second controller. The turbine engine may include the compressor section, the combustor section, the turbine section and the flowpath. The engine controller may be configured to control operation of the turbine engine. The open guide vane structure may include the structure base and a plurality of open guide vanes arranged circumferentially about the axis. Each of the open guide vanes may project radially out from the structure base into the environment external to the aircraft propulsion system. The vane actuation system may be configured to change pitch of one or more of the open guide vanes. The second controller may be configured to control operation of the vane actuation system. The second controller may be discrete from the engine controller.

The flowpath may be a core flowpath. The assembly may also include a bypass flowpath splitting off from the core flowpath at a location between the inlet into the core flowpath and the combustor section. The bypass flowpath may bypass at least the combustor section and the turbine section.

The second structure section may be removably attached to the first structure section.

The second structure section may be movably attached to the first structure section.

The first set of the guide vanes may have a greater number of guide vanes than the second set of the guide vanes.

The structure may be supported by a pylon structure. The pylon structure may support the aircraft propulsion system.

The second structure segment may extend between ninety degrees and three hundred degrees circumferentially about the axis between the second segment first end and the second segment second end.

The assembly may also include a third structure segment extending circumferentially about the axis between a third segment first end and a third segment second end. A third set of the guide vanes may project radially out from the third structure segment. The third structure segment may be pivotally attached to the first structure segment.

The third structure segment may be pivotally attached to the first structure segment at the first segment second end. The second structure segment may be pivotally attached to the first structure segment at the first segment first end.

The third structure segment may be removably attached to the second structure segment at a joint between the third structure segment and the second structure segment.

The first set of the guide vanes may include a first open guide vane pivotable about a first pivot axis. The first open guide vane may be configured to pivot to a first access position to facilitate opening of the second structure segment from a stowed position to an open position. The second set of the guide vanes may include a second open guide vane pivotable about a second pivot axis and circumferentially neighboring the first open guide vane. The second open guide vane may be configured to pivot to a second access position to facilitate opening of the second structure segment from the stowed position to the open position.

The assembly may also include a vane actuation system and a controller. The vane actuation system may be configured to change pitch of one or more of the open guide vanes. The controller may be configured to control operation of the vane actuation system.

The controller may be discrete from an engine controller configured to control operation of a turbine engine of the aircraft propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
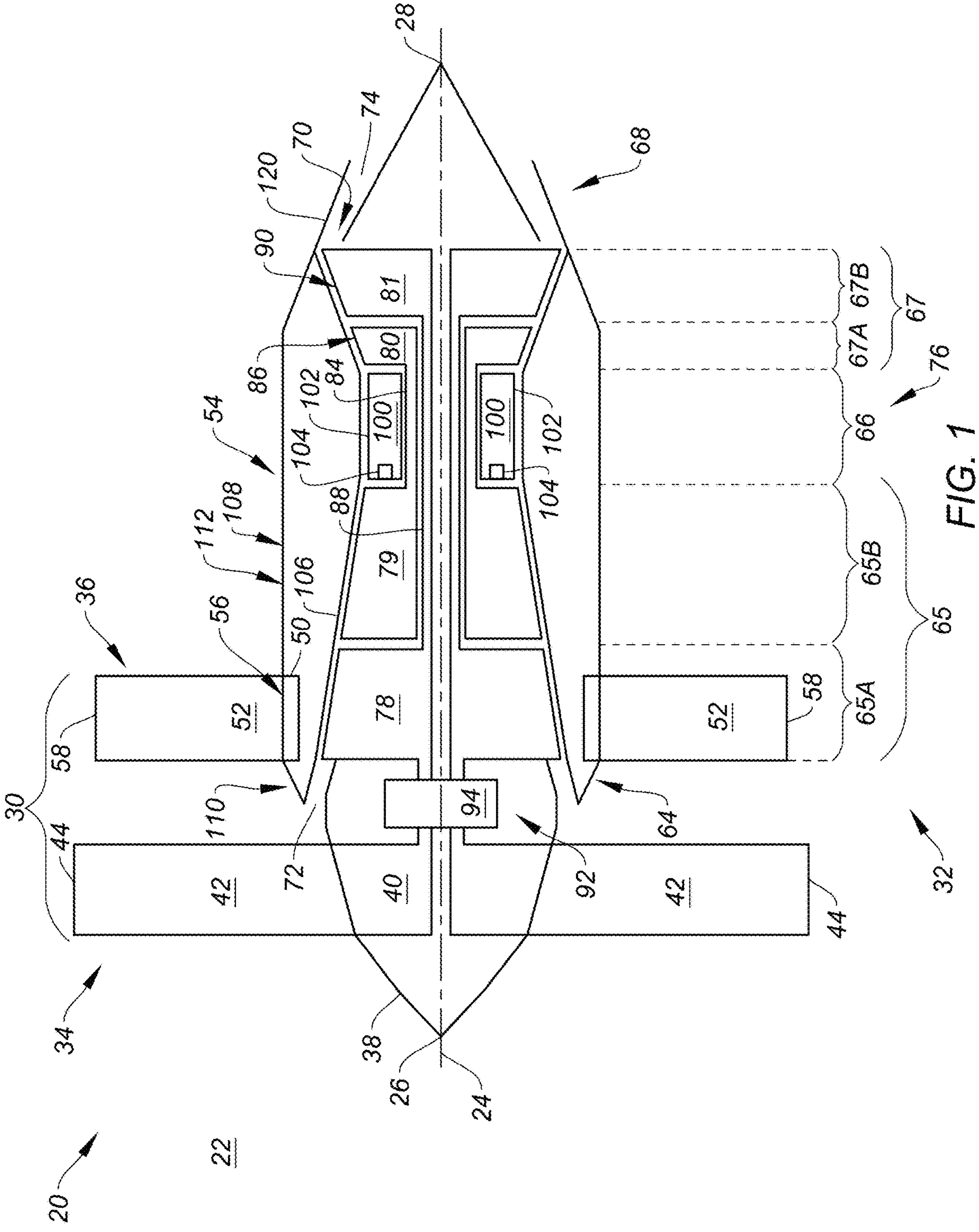
FIG. 1 is a schematic sectional illustration of an aircraft propulsion system.

FIG. 1 is a schematic illustration of a propulsion system 20 for an aircraft. The aircraft may be an airplane, a drone (e.g., an unmanned aerial vehicle (UAV)), or any other manned or unmanned aerial vehicle or system. The aircraft propulsion system 20 may be configured as an open rotor propulsion system with a single open rotor and swirl recovery vane (SRV) architecture. Herein, the term "open" may describe a propulsion system section and/or a propulsion system component which is open to an environment 22 (e.g., an ambient environment) external to the aircraft propulsion system 20 and, more generally, the aircraft.

The aircraft propulsion system 20 extends axially along an axis 24 between an upstream, forward end 26 of the aircraft propulsion system 20 and a downstream, aft end 28 of the aircraft propulsion system 20. The propulsion system axis 24 may be a centerline axis of the aircraft propulsion system 20 and/or a centerline axis of one or more members of the aircraft propulsion system 20. The propulsion system axis 24 may also or alternatively be a rotational axis of one or more members of the aircraft propulsion system 20. The aircraft propulsion system 20 of FIG. 1 includes an open rotor propulsion section 30 and a gas turbine engine 32.

Figure 17:
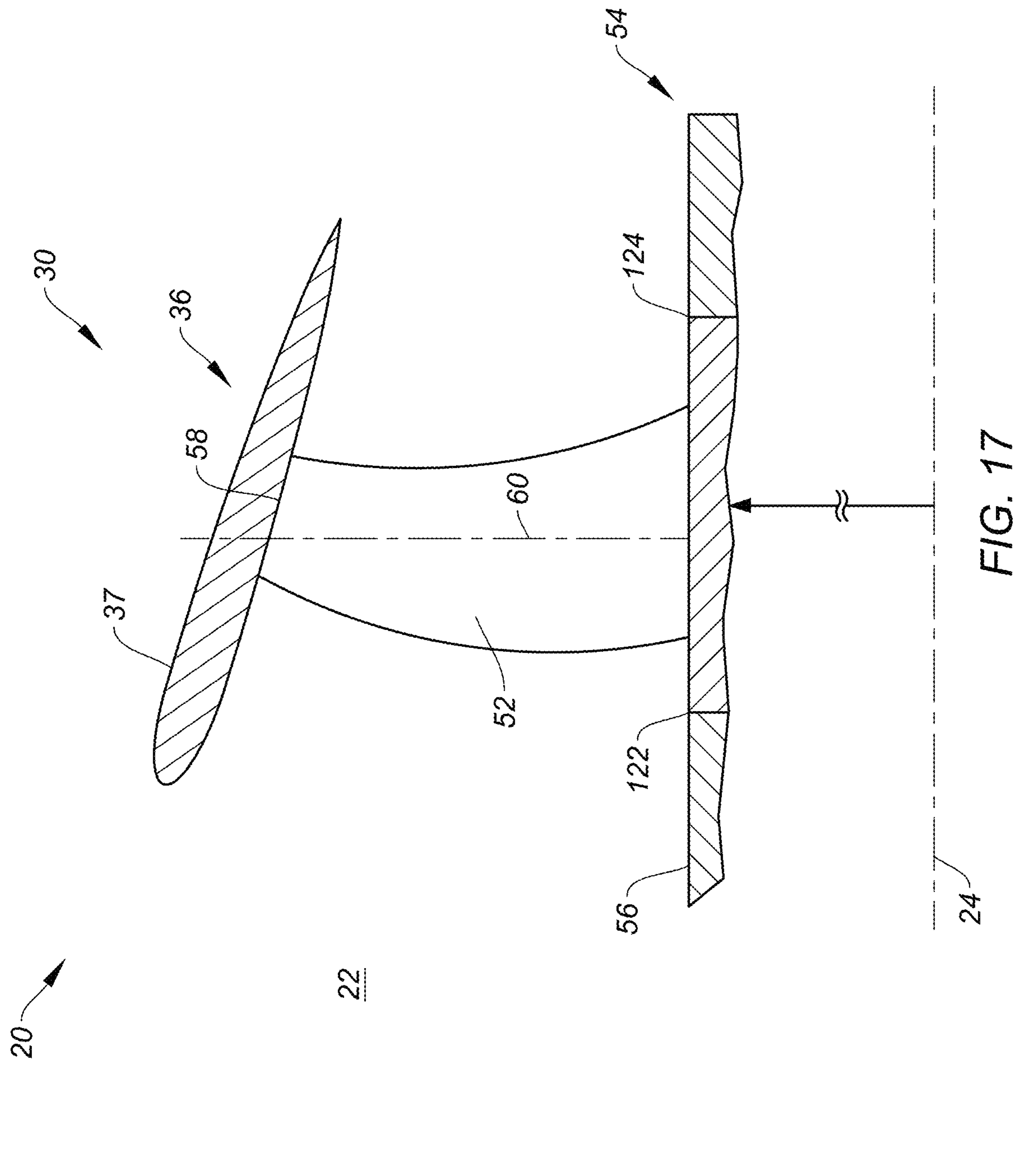
FIG. 17 is a sectional illustration of a portion of the aircraft propulsion system with shrouded guide vanes.

The propulsion section 30 of FIG. 1 includes an open propulsor rotor 34 and an open guide vane structure 36. These propulsion section members 34 and 36 are un-ducted and/or unshrouded components of the aircraft propulsion system 20 and its propulsion section 30. In some embodiments, however, one or more of the propulsion section members 34 and 36 may be un-ducted yet may each include a small shroud. For example, referring to FIG. 17, the guide vane structure 36 may include a shroud 37 at distal tips 58 of its open exit guide vane 52. This shroud 37 may be provided for aerodynamic considerations and may be dedicated to and/or part of the guide vane structure 36; e.g., the shroud 37 does not axially overlap and shroud the propulsor rotor 34. Referring again to FIG. 1, the propulsion section 30 also includes a nose cone 38 disposed at (e.g., on, adjacent or proximate) the propulsion system forward end 26. Briefly, this nose cone 38 may be configured as a spinner which is rotatable with the propulsor rotor 34 about the propulsion system axis 24. Alternatively, the nose cone 38 may be configured as a stationary structure of the propulsion section 30.

The propulsor rotor 34 includes a rotor base 40 (e.g., a disk or a hub) and a plurality of open propulsor blades 42 (e.g., airfoils). The propulsor blades 42 are arranged and may be equispaced circumferentially about the rotor base 40 and the propulsion system axis 24 in an array; e.g., a circular array. Each of the propulsor blades 42 is connected to (e.g., formed integral with or otherwise attached to) the rotor base 40. Each of the propulsor blades 42 projects spanwise along a span line of the respective propulsor blade 42 (e.g., radially relative to the propulsion system axis 24) out from an exterior surface of the rotor base 40, into the external environment 22, to an unshrouded distal tip 44 of the respective propulsor blade 42. Each propulsor blade 42 is thereby configured as an un-ducted and unshrouded propulsor blade 42 which is exposed to (e.g., disposed in) the surrounding external environment 22.

Figure 2:
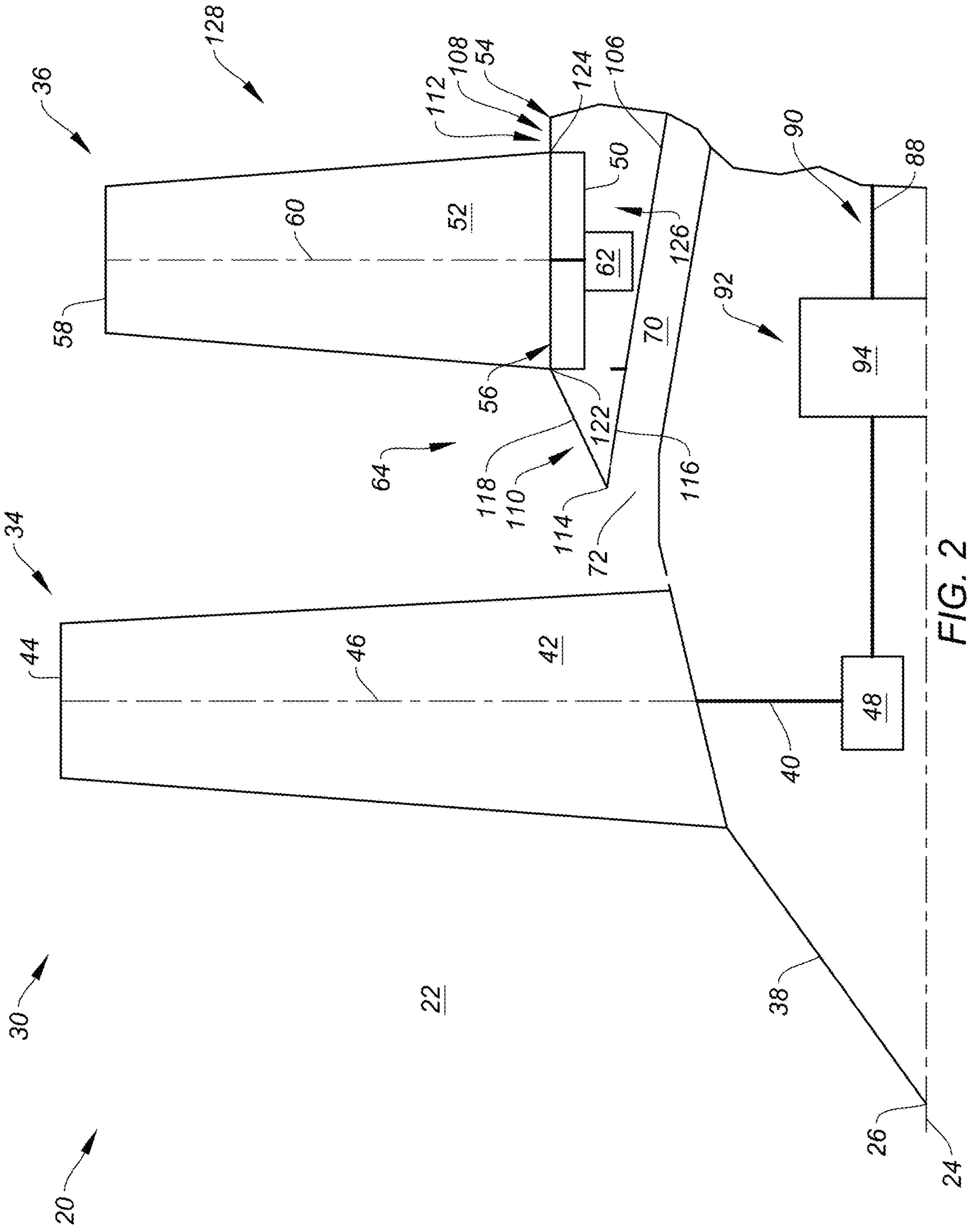
FIG. 2 is a partial schematic sectional illustration of the aircraft propulsion system at a propulsion section.

Referring to FIG. 2, each propulsor blade 42 may be configured to pivot about a respective blade pivot axis 46. This blade pivot axis 46 extends radially relative to the propulsion system axis 24. The blade pivot axis 46 of FIG. 2, for example, is arranged perpendicular to the propulsion system axis 24 when viewed, for example, in a longitudinal reference plane parallel to (e.g., including) the propulsion system axis 24; e.g., the plane of FIG. 2. Each propulsor blade 42 of FIG. 2 is operatively coupled with a blade actuation system 48. This blade actuation system 48 is configured to pivot each propulsor blade 42 about its own respective blade pivot axis 46. By pivoting each propulsor blade 42 about its blade pivot axis 46, a pitch of the respective propulsor blade 42 may be changed. Note, while the blade pivot axis 46 is shown in FIG. 2 as being perpendicular to the propulsion system axis 24, it is contemplated this blade pivot axis 46 may or may not be coincident with the propulsion system axis 24. Moreover, it is contemplated each blade pivot axis 46 may alternatively be angularly offset from the propulsion system axis 24 by an acute angle or an obtuse angle when viewed, for example, in the longitudinal reference plane. Of course, it is contemplated some or all of the propulsor blades 42 may be alternatively moved to change the propulsor blade pitch. Moreover, it is contemplated some or all of the propulsor blades 42 may alternatively be fixed pitch propulsor blades in other embodiments.

The guide vane structure 36 of FIG. 1 includes a guide vane structure base 50 (e.g., a support ring, a skinned support frame, etc.) and a plurality of the open exit guide vanes 52; e.g., airfoils. Briefly, at least (or only) a radial outer side of the structure base 50 and a radial outer side of a stationary housing structure 54 for the aircraft propulsion system 20 collectively form an aerodynamic exterior flow boundary 56 of the aircraft propulsion system 20 (e.g., a propulsion system mold line) which borders the external environment 22. The guide vanes 52 are arranged and may be equispaced circumferentially about the propulsion system axis 24 and the structure base 50 in an array; e.g., a circular array. This guide vane structure 36 and its guide vanes 52 are arranged axially next to (e.g., adjacent) the propulsor rotor 34 and its propulsor blades 42. The guide vane structure 36 and its guide vanes 52 of FIG. 1, for example, are arranged downstream of the propulsor rotor 34 and its propulsor blades 42, without (e.g., any) other elements axially therebetween to obstruct, turn and/or otherwise influence the air propelled by the propulsor rotor 34 to the guide vane structure 36 for example. Each of the guide vanes 52 of FIG. 1 is coupled to the structure base 50. Each of the guide vanes 52 projects spanwise along a span line of the respective guide vane 52 (e.g., radially relative to the propulsion system axis 24) out from the structure base 50 at the exterior flow boundary 56, into the external environment 22, to the distal tip 58 of the respective guide vane 52, which may be unshrouded or shrouded. Each guide vane 52 is thereby configured as an un-ducted and/or unshrouded guide vane which is exposed to (e.g., disposed in) the surrounding external environment 22.

Referring to FIG. 2, each guide vane 52 may be configured to pivot about a respective vane pivot axis 60. This vane pivot axis 60 extends radially relative to the propulsion system axis 24. The vane pivot axis 60 of FIG. 2, for example, is arranged perpendicular to the propulsion system axis 24 when viewed, for example, in the longitudinal reference plane. Each guide vane 52 of FIG. 2 is operatively coupled with a vane actuation system 62, which vane actuation system 62 of FIG. 2 is discrete from the blade actuation system 48. The vane actuation system 62 is configured to pivot each guide vane 52 about its own respective vane pivot axis 60. By pivoting each guide vane 52 about its vane pivot axis 60, a pitch of the respective guide vane 52 may be changed. Note, while the vane pivot axis 60 is shown in FIG. 2 as being perpendicular to the propulsion system axis 24, it is contemplated this vane pivot axis 60 may or may not be coincident with the propulsion system axis 24. Moreover, it is contemplated each vane pivot axis 60 may alternatively be angularly offset from the propulsion system axis 24 by an acute angle or an obtuse angle when viewed, for example, in the longitudinal reference plane. Of course, it is contemplated some or all of the guide vanes 52 may be alternatively moved to change the guide vane pitch. Moreover, it is contemplated some or all of the guide vanes 52 may alternatively be fixed pitch guide vanes in other embodiments.

Referring to FIG. 1, the turbine engine 32 includes an inlet section 64, a compressor section 65, a combustor section 66, a turbine section 67 and an exhaust section 68. The compressor section 65 of FIG. 1 includes a low pressure compressor (LPC) section 65A and a high pressure compressor (HPC) section 65B. The turbine section 67 of FIG. 1 includes a high pressure turbine (HPT) section 67A and a low pressure turbine (LPT) section 67B. The turbine engine 32 also includes an (e.g., annular) engine flowpath 70 which extends longitudinally through the aircraft propulsion system 20 of FIG. 1 and its turbine engine 32 from an (e.g., annular) airflow inlet 72 into the engine flowpath 70 to a (e.g., annular) combustion products exhaust 74 from the engine flowpath 70. The flowpath inlet 72 is also an airflow inlet into the aircraft propulsion system 20 of FIG. 1 and its turbine engine 32. The flowpath exhaust 74 is also a combustion products exhaust from the aircraft propulsion system 20 of FIG. 1 and its turbine engine 32. At least (or only) the LPC section 65A, the HPC section 65B, the combustor section 66, the HPT section 67A and the LPT section 67B collectively form a core 76 (e.g., a gas generator) of the turbine engine 32.

Each of the engine sections 65A, 65B, 67A and 67B includes a respective bladed rotor 78-81; e.g., a ducted and/or shrouded engine rotor. Each of these engine rotors 78-81 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 70. Each of the rotor blades is connected to the respective rotor base. Each of the rotor blades projects radially (e.g., spanwise) out from the respective rotor base into the engine flowpath 70 and to a distal tip of the respective rotor blade.

The HPC rotor 79 is coupled to and rotatable with the HPT rotor 80. The HPC rotor 79 of FIG. 1, for example, is connected to the HPT rotor 80 by a high speed shaft 84. At least (or only) the HPC rotor 79, the HPT rotor 80 and the high speed shaft 84 collectively form a high speed rotating structure 86; e.g., a high speed spool of the engine core 76. This high speed rotating structure 86 of FIG. 1 and its members 79, 80 and 84 are rotatable about the propulsion system axis 24. However, in other embodiments, the high speed rotating structure 86 and its members 79, 80 and 84 may alternatively be rotatable about another rotational axis which is (e.g., laterally and/or angularly) offset from the rotational axis of the propulsor rotor 34.

The LPC rotor 78 is coupled to and rotatable with the LPT rotor 81. The LPC rotor 78 of FIG. 1, for example, is connected to the LPT rotor 81 by a low speed shaft 88. At least (or only) the LPC rotor 78, the LPT rotor 81 and the low speed shaft 88 collectively form a low speed rotating structure 90; e.g., a low speed spool of the engine core 76. This low speed rotating structure 90 of FIG. 1 and its members 78, 81 and 88 are rotatable about the propulsion system axis 24. However, in other embodiments, the low speed rotating structure 90 and its members 78, 81 and 88 may alternatively be rotatable about another rotational axis which is (e.g., laterally and/or angularly) offset from the rotational axis of the propulsor rotor 34.

The low speed rotating structure 90 is coupled to the propulsor rotor 34 through a drivetrain 92. This drivetrain 92 may be configured as a geared drivetrain, where a geartrain 94 (e.g., a transmission, a speed change device, an epicyclic geartrain, etc.) is disposed between and operatively couples the propulsor rotor 34 to the low speed rotating structure 90 and its LPC rotor 78 and its LPT rotor 81. With this arrangement, the propulsor rotor 34 may rotate at a different (e.g., slower) rotational speed than the low speed rotating structure 90 and its LPC rotor 78 and its LPT rotor 81. Here, the propulsor rotor 34 and the low speed rotating structure 90 may rotate in a common (the same) direction about the propulsion system axis 24 or in opposite directions about the propulsion system axis 24 depending, for example, upon the specific configuration of the geartrain 94. Alternatively, the drivetrain 92 may be configured as a direct-drive drivetrain, where the geartrain 94 is omitted. With such an arrangement, the propulsor rotor 34 rotates at a common (the same) rotational speed as the low speed rotating structure 90 and its LPC rotor 78 and its LPT rotor 81.

During operation of the aircraft propulsion system 20 of FIG. 1, ambient air within the external environment 22 is propelled by the rotating propulsor rotor 34 in the downstream, aft direction towards the propulsion system aft end 28. A major portion (e.g., more than 50%) of this air bypasses the turbine engine 32 to provide forward thrust while a minor portion (e.g., less than 50%) of the air flows into the turbine engine 32. For example, an outer stream of the air propelled by the rotating propulsor rotor 34 flows axially across the guide vane structure 36 and outside of the housing structure 54 and the structure base 50; e.g., along the exterior flow boundary 56. The guide vane structure 36 conditions (e.g., straightens out, de-swirls, etc.) the outer stream of air within the external environment 22 to enhance the forward thrust. By contrast, an inner stream of the air propelled by the rotating propulsor rotor 34 may bypass the guide vane structure 36 and enter the turbine engine 32 and its engine flowpath 70 through the flowpath inlet 72. The air entering the engine flowpath 70 through the flowpath inlet 72 may be referred to as "core air".

The core air is compressed by the LPC rotor 78 and the HPC rotor 79 and directed into a combustion chamber 100 (e.g., an annular combustion chamber) of a combustor 102 (e.g., an annular combustor) in the combustor section 66. Fuel is injected into the combustion chamber 100 by one or more fuel injectors 104 and mixed with the compressed core air to provide a fuel-air mixture. This fuel-air mixture is ignited and combustion products thereof flow through and sequentially drive rotation of the HPT rotor 80 and the LPT rotor 81. The rotation of the HPT rotor 80 and the LPT rotor 81 respectively drive rotation of the HPC rotor 79 and the LPC rotor 78 and, thus, compression of the core air. The rotation of the LPT rotor 81 also drives the rotation of the propulsor rotor 34 through the geartrain 94. The turbine engine 32 and its low speed rotating structure 90 thereby power operation of (e.g., drive rotation of) the propulsor rotor 34 during aircraft propulsion system operation.

The engine sections 64-68 may be arranged sequentially along the propulsion system axis 24 and are housed within and/or formed by the housing structure 54. This housing structure 54 includes an engine case 106 (e.g., a gas generator case with one or more axial and/or circumferential sections) and a nacelle 108. The engine case 106 houses one or more of the engine sections 65A-67B; e.g., the engine core 76. The engine case 106 of FIG. 1, for example, extends axially along (e.g., axially overlaps) and extends circumferentially about (e.g., circumscribes) the engine sections 65A-67B and their respective bladed rotors 78-81. The engine case 106 may also house the geartrain 94. The nacelle 108 houses and provides an aerodynamic cover over the engine case 106. The nacelle 108 of FIG. 1, for example, is disposed radially outboard of, extends axially along (e.g., axially overlaps) and extends circumferentially about (e.g., circumscribes) the engine core 76 and its engine case 106. With the foregoing arrangement, the bladed rotors 78-81 are disposed within the housing structure 54. By contrast, the propulsor blades 42 and the guide vanes 52 are disposed (e.g., completely) outside of the housing structure 54.

The nacelle 108 of FIG. 2 includes an inlet structure 110 and an aft nacelle structure 112 (see also FIG. 1). The inlet structure 110 is disposed at an upstream, forward end 114 of the housing structure 54 next to and downstream of the propulsor rotor 34 and its propulsor blades 42. The inlet structure 110 is configured as an annular airflow splitter (e.g., an annular inlet lip of the nacelle 108) which splits the airflow propelled by the propulsor rotor 34 into the outer stream and the inner stream. A radial inner portion 116 of the inlet structure 110 of FIG. 2, for example, forms an outer peripheral boundary of the flowpath inlet 72 into the aircraft propulsion system 20 at the housing structure forward end 114. A radial outer portion 118 of the inlet structure 110 forms an upstream, forward axial section of the exterior flow boundary 56, upstream and forward of the guide vane structure 36 and its structure base 50. This outer portion 118 of the inlet structure 110 meets the inner portion 116 of the inlet structure 110 at the housing structure forward end 114.

Referring to FIG. 1, the aft nacelle structure 112 forms a downstream, aft axial section of the exterior flow boundary 56, downstream and aft of the guide vane structure 36 and its structure base 50. This aft nacelle structure 112 may include one or more nacelle cowls disposed to opposing lateral sides of the aircraft propulsion system 20. Each of these nacelle cowls may be configured to pivot or otherwise move from a stowed position (for propulsion system operation) to an open position (for accessing engine accessories and/or the engine core 76 during turbine engine maintenance, inspection or the like). The aft nacelle structure 112 or, more generally, the housing structure 54 may also include an exhaust nozzle 120 which forms an outer peripheral boundary of the flowpath exhaust 74.

Referring to FIG. 2, a downstream, aft end 122 of the inlet structure 110 is axially spaced apart from an upstream, forward end 124 of the aft nacelle structure 112 to form axial ends of an opening into a vane structure receptacle 126 for the guide vane structure 36 in the housing structure 54. This vane structure receptacle 126 extends axially within the housing structure 54 between and to a region at the aft end 122 of the inlet structure 110 and a region at the forward end 124 of the aft nacelle structure 112. The vane structure receptacle 126 projects radially into the housing structure 54 from the exterior flow boundary 56 partially towards or to the engine case 106. The vane structure receptacle 126 extends within the housing structure 54 circumferentially about (e.g., completely around) the propulsion system axis 24 and the turbine engine 32. Herein, the term "receptacle" is used to describe an open space (e.g., unoccupied volume) in the aircraft propulsion system 20 inboard of the exterior flow boundary 56. This open space may or may not be defined by walls within the aircraft propulsion system 20. For example, a radial inner side (e.g., a bottom side) of the vane structure receptacle 126 may be formed by the engine case 106, one or more mounting structures attached to the engine case 106 and/or peripheral equipment mounted with the engine case 106. In another example, an axial side of the vane structure receptacle 126 may be formed by various supports, frames, accessories and/or the like part of and/or housed radially beneath the nacelle members 110, 112.

Figure 18:
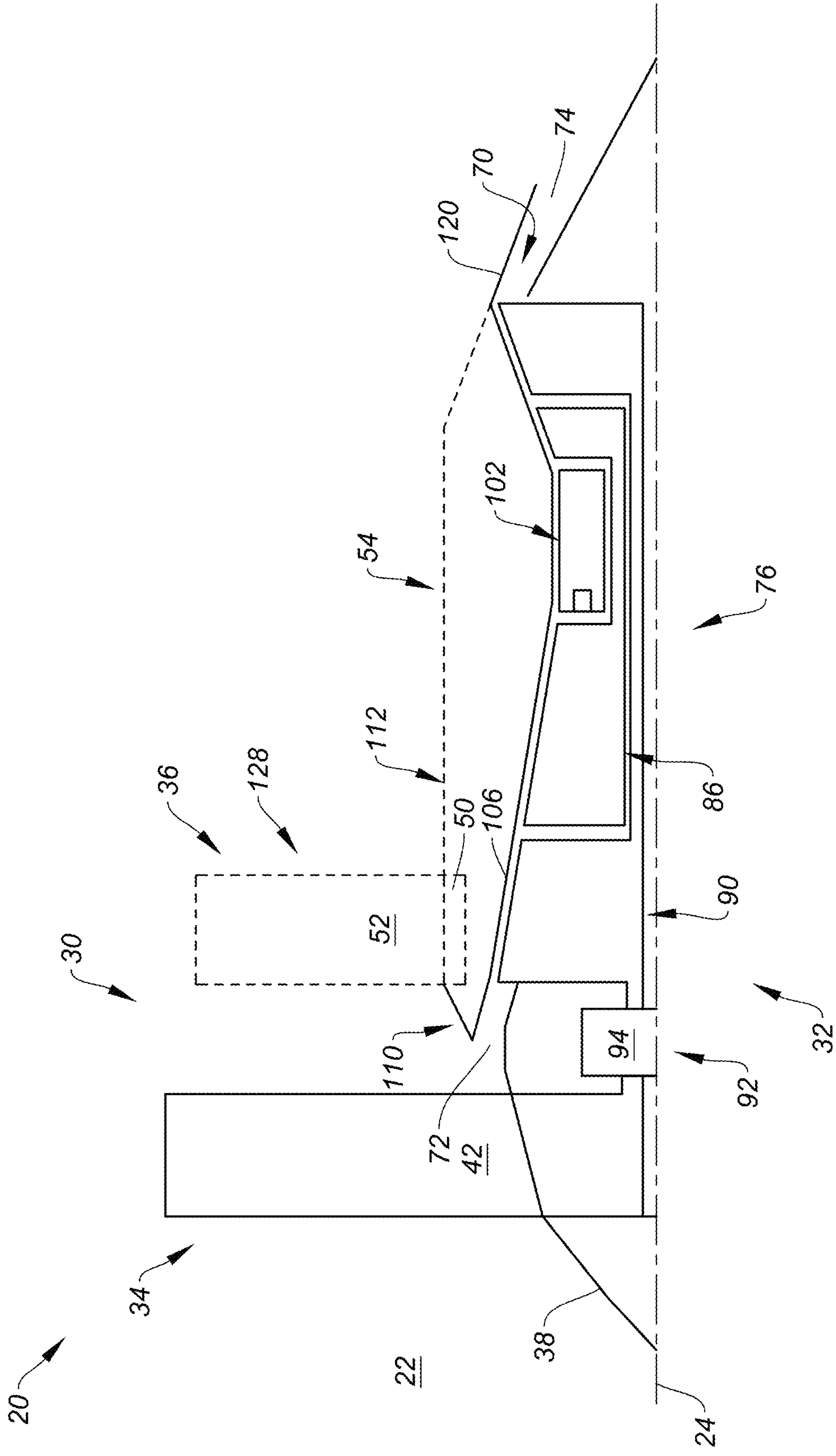
FIGS. 18 and 19 are partial schematic sectional illustrations of the aircraft propulsion system with various other modular arrangements.
Figure 19:
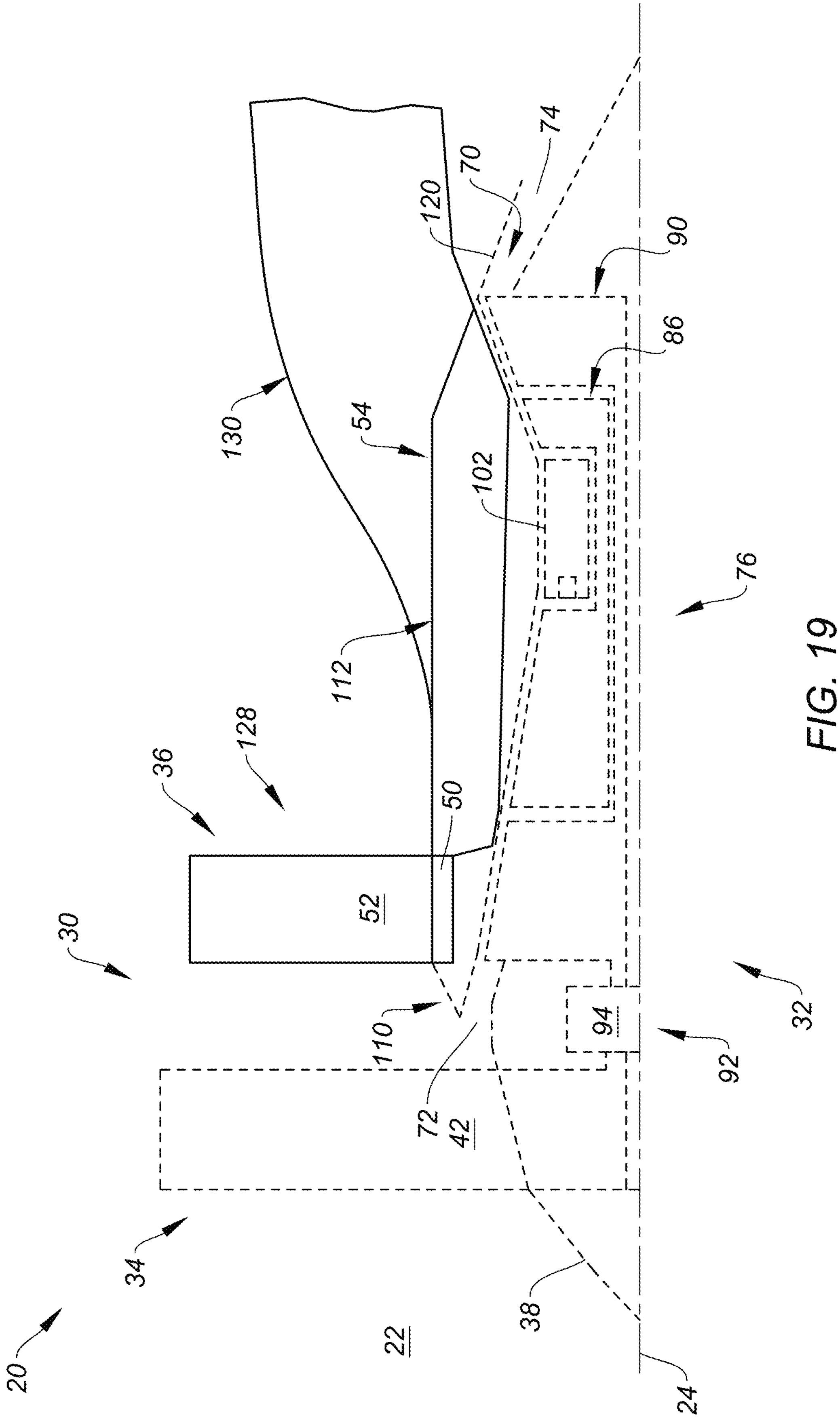

The housing structure 54 and its vane structure receptacle 126 are configured to mate with and receive the guide vane structure 36 and its structure base 50. More particularly, the structure base 50 of FIG. 2 is disposed within the vane structure receptacle 126 such that the outer side of the structure base 50 may be flush with radial outer sides of the nacelle members 110 and 112 to collectively form the exterior flow boundary 56. Here, the exterior flow boundary 56 of FIG. 2 is collectively formed by the propulsion system members 50, 110, 112 and 120 with substantially few or no interruptions, except for seams between the propulsion system members 110 and 50, 50 and 112, 112 and 120. With this arrangement, referring to FIG. 3, the guide vane structure 36 may be configured as a module 128 which may be removed from or installed with the rest of the aircraft propulsion system 20 (e.g., propulsion system members 32, 34 and 54) as a single unit. Alternatively, referring to FIG. 4, the rest of the aircraft propulsion system 20 (e.g., propulsion system members 32, 34 and 54) may be configured to be removed from or installed with the guide vane structure 36 and/or a pylon structure 130 for the aircraft propulsion system 20 while the guide vane structure 36 remains (e.g., completely) mounted to, integrated with or otherwise connected to the pylon structure 130. In other embodiments, referring to FIGS. 18 and 19, it is contemplated the aft nacelle structure 112 may be configured as part of the guide vane structure module 128 or as another separate module which may (or may not) remain (e.g., completely) mounted to, integrated with or otherwise connected to the pylon structure 130. Though the pylon structure 130 is depicted in the drawings as being located at and coupled to a top of the propulsion system 20 (e.g., top dead center as in an under wing mounted system), this is not intended to be so limiting, and the pylon structure 130 may be coupled to a side or a bottom portion of the propulsion system 20 (e.g., overwing mount, empennage mount, etc.).

Figure 5:
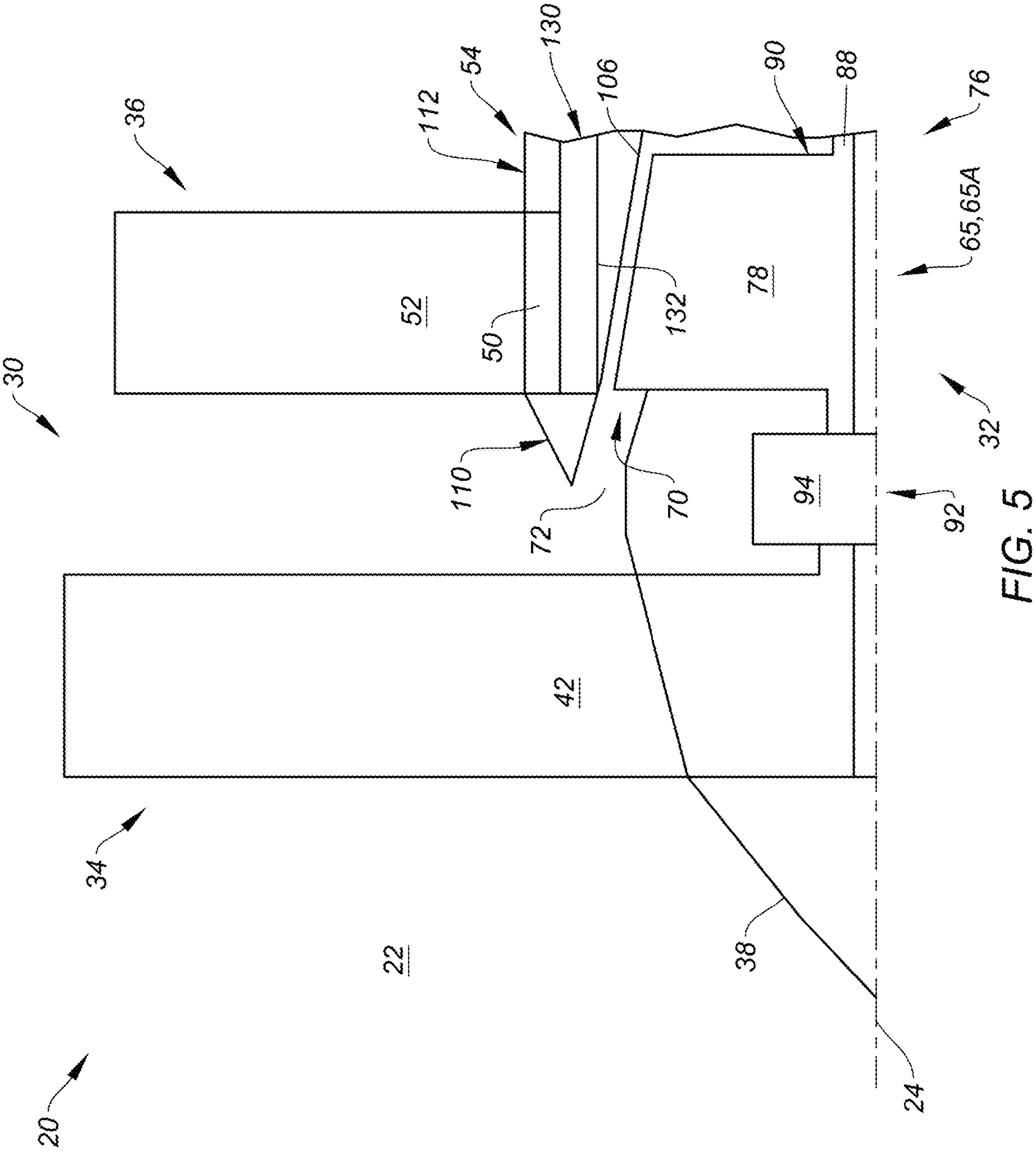
FIG. 5 is a partial schematic sectional illustration of the aircraft propulsion system with a guide vane structure base mounted to a pylon structure.

In some embodiments, referring to FIG. 5, the guide vane structure 36 and its structure base 50 may be mounted to the pylon structure 130. The structure base 50 of FIG. 5, for example, may be mechanically fastened to the pylon structure 130 with one or more fasteners. Here, the structure base 50 is disposed radially outboard of and axially overlaps an end portion 132 (e.g., a cantilevered beam, a truss, etc.) of the pylon structure 130. In other embodiments, referring to FIG. 6, the guide vane structure 36 and its structure base 50 may be integrated with the pylon structure 130. The structure base 50 of FIG. 6, for example, may be formed integral with (e.g., part of) the end portion 132 of the pylon structure 130.

Figure 6:
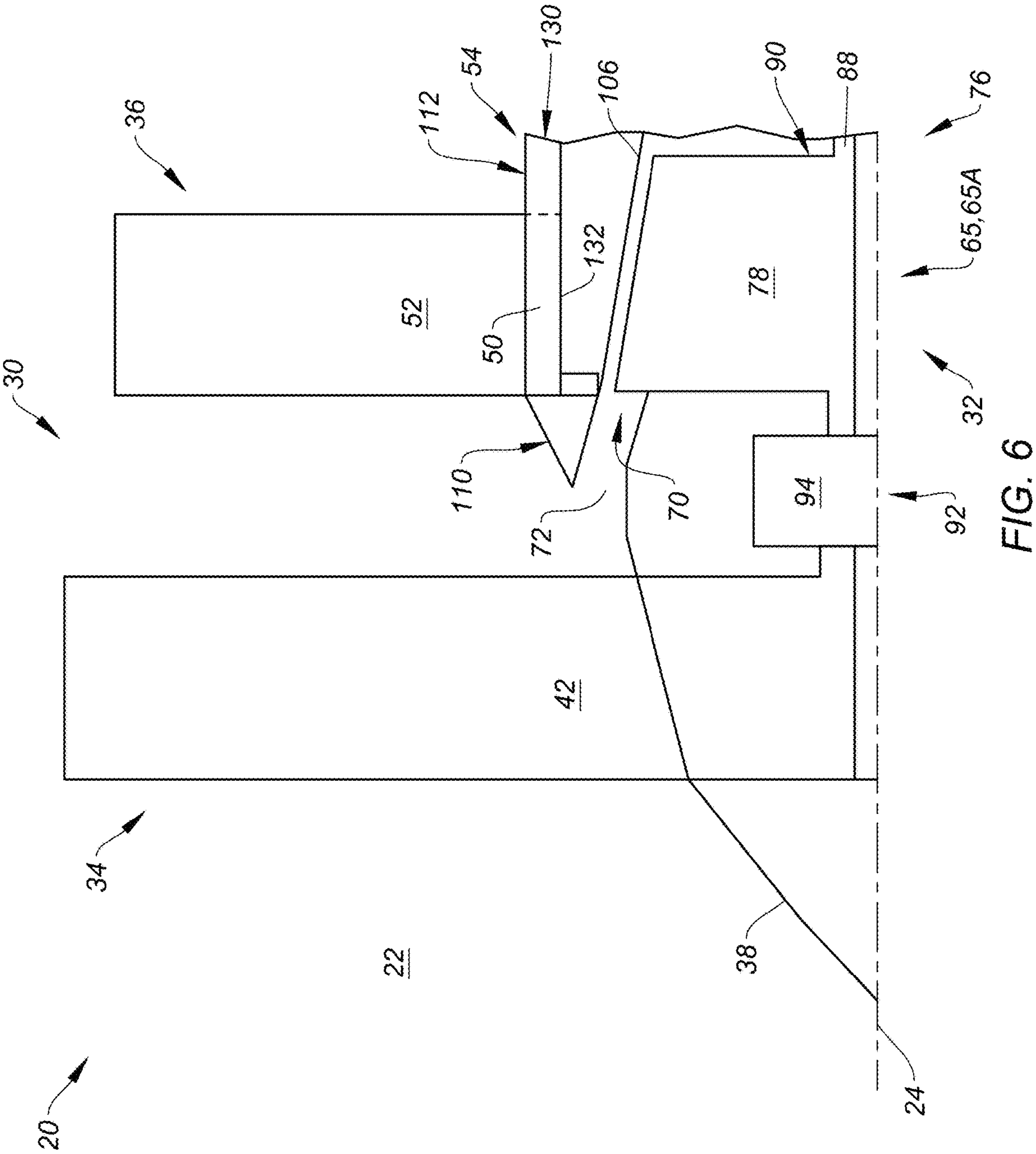
FIG. 6 is a partial schematic sectional illustration of the aircraft propulsion system with the guide vane structure base integrated as part of the pylon structure.

In some embodiments, referring to FIGS. 5 and 6, the guide vane structure 36 may be connected to the pylon structure 130 independent of (e.g., separate from, not through, not structurally dependent on, etc.) the turbine engine 32 and its engine case 106. The structure base 50 of FIGS. 5 and 6, for example, is (e.g., directly) mounted to, formed integral with and/or otherwise connected to the pylon structure 130. The structure base 50 is thereby structurally tied to the pylon structure 130 independent of the turbine engine 32 and its engine case 106 as well as, for example, independent of (e.g., any) mounting structure(s) which structurally tie the turbine engine 32 and its engine case 106 to the pylon structure 130. With this arrangement, a weight of the guide vane structure 36 is supported (e.g., directly) by the pylon structure 130 and not the turbine engine 32. Thus, an overhung weight of the rest of the aircraft propulsion system 20 (e.g., propulsion system members 34 and 92) may be reduced.

In some embodiments, referring to FIG. 5, one or more of the propulsion system members 32 and 54 may be mounted to the pylon structure 130 independent of the guide vane structure 36. The propulsion system members 32 and 54 of FIG. 5, for example, are collectively (e.g., directly or indirectly) mounted to the pylon structure 130 via load paths independent of the guide vane structure 36/the vane structure receptacle 126. The propulsion system members 32 and 54 are thereby collectively structurally tied to the pylon structure 130 independent of the guide vane structure 36 and its structure base 50. In other embodiments, referring to FIG. 6, one or more of the propulsion system members 32 and 54 may be mounted to the pylon structure 130 through the guide vane structure 36. The propulsion system members 32 and 54 of FIG. 6, for example, are collectively (e.g., directly or indirectly) mounted to the end portion 132 of the pylon structure 130 and, thus, the structure base 50 which is formed integral with the end portion 132 of the pylon structure 130. With both arrangements of FIGS. 5 and 6, the overhung weight of the aircraft propulsion system 20 may be reduced as the end portion 132 of the pylon structure 130 may project axially along or axially forward of the guide vane structure 36 and its structure base 50.

Figure 8:
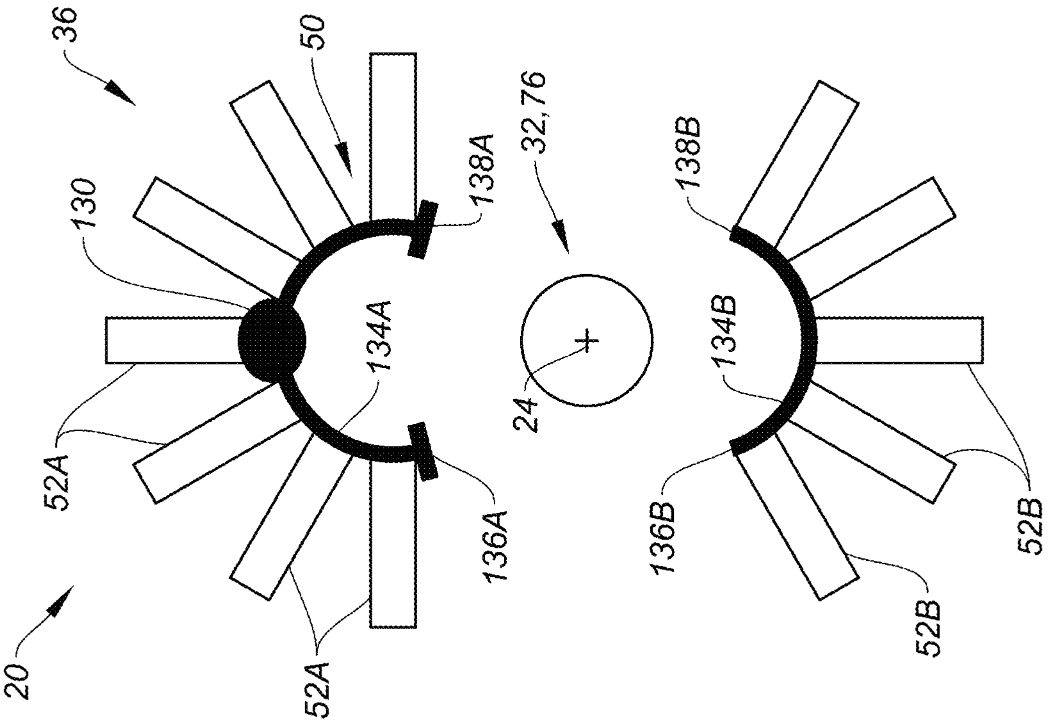
FIGS. 7 and 8 are schematic cross-sectional illustrations of a segmented guide vane structure in stowed and opened arrangements.
Figure 7:
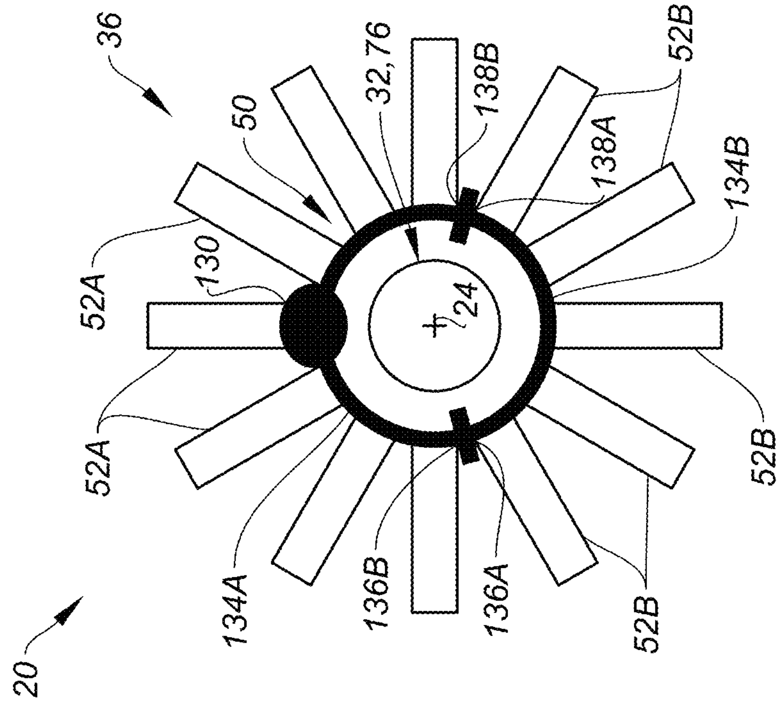

In some embodiments, referring to FIGS. 7 and 8, the structure base 50 may be circumferentially segmented into a plurality of structure segments 134A and 134B (generally referred to as "134"). Each of these structure segments 134A, 134B extends circumferentially about the propulsion system axis 24 and the turbine engine 32 between circumferentially opposing ends 136A, 136B (generally referred to as "136") and 138A, 138B (generally referred to as "138") of the respective structure segment 134. The second structure segment 134B, for example, may extend between ninety (90°) and three-hundred degrees (300°) inclusive about the propulsion system axis 24 between its opposing circumferential ends 136B and 138B. More particularly, the second structure segment 134B may extend between one-hundred and sixty degrees (160°) and two-hundred degrees (200°) inclusive about the propulsion system axis 24 between its opposing circumferential ends 136B and 138B. The first structure segment 134A may then extend a remainder of the full three-hundred and sixty degree hoop of the structure base 50 about the propulsion system axis 24 between its opposing circumferential ends 136A and 138A. For example, the first structure segment 134A extends sixty degrees (60°) centered about the pylon structure 130 and the second structure segment 134B extends three-hundred degrees (300°) to mate 136A to 136B, and 138A to 138B.

The first structure segment 134A of FIG. 7 (e.g., a top structure segment, a fixed structure segment, etc.) may be mounted to, integrated with and/or otherwise connected to the pylon structure 130, for example as described above with respect to FIG. 5 or 6. The second structure segment 134B of FIG. 7 (e.g., a bottom structure segment, a removable structure segment, etc.) is disposed diametrically opposite the first structure segment 134A. At the segment first ends 136, the second structure segment 134B is attached (e.g., mechanically fastened) to the first structure segment 134A. Similarly, at the segment second ends 138, the second structure segment 134B is attached (e.g., mechanically fastened) to the first structure segment 134A. With this arrangement, referring to FIG. 8, the second structure segment 134B may be detached from the first structure segment 134A to remove the second structure segment 134B from the aircraft propulsion system 20 and provide access to the turbine engine 32 and its engine core 76 for maintenance, inspection and/or otherwise. The removal of the second structure segment 134B may also provide an opening through which the turbine engine 32 and its engine core 76 and/or other turbine engine components, etc. may also be removed from or installed with the aircraft propulsion system 20.

Each structure segment 134A, 134B of FIG. 7 is associated with a set of one or more of the guide vanes 52A, 52B (generally referred to as "52"). Each of the first set guide vanes 52A is connected to and projects radially out from the first structure segment 134A. Each of the second set guide vanes 52B is connected to and projects radially out from the second structure segment 134B. Note, while each set of the guide vanes 52 in FIG. 7 is shown with a different number of the guide vanes 52, it is contemplated the guide vane sets may alternatively be configured with a common number of the guide vanes 52.

Figure 10:
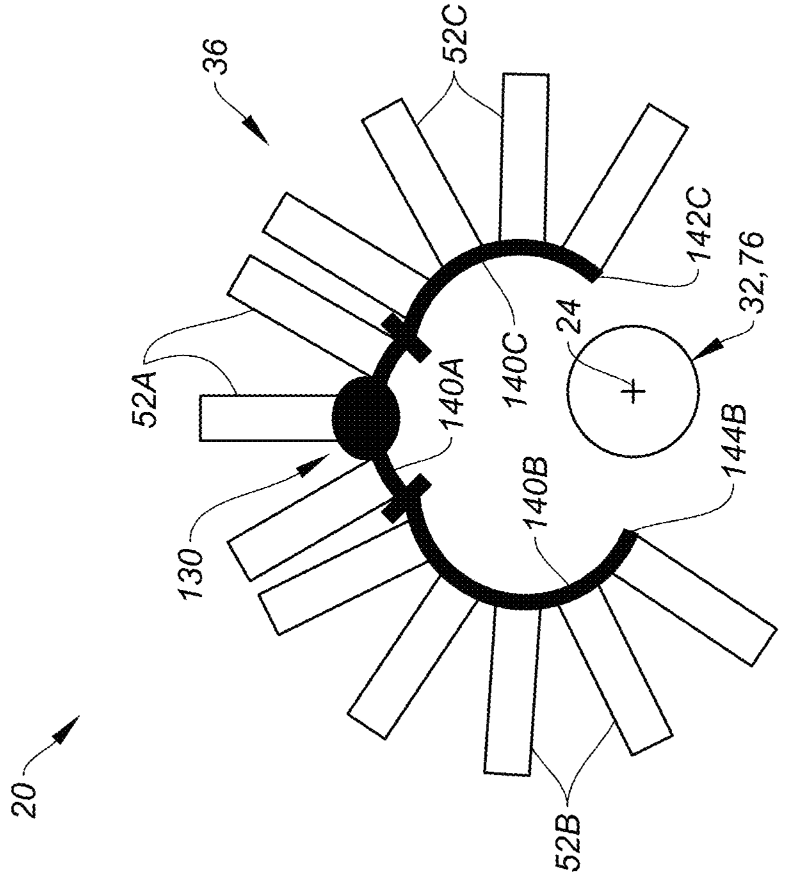
FIGS. 9 and 10 are schematic cross-sectional illustrations of another segmented guide vane structure in stowed and opened arrangements.
Figure 9:
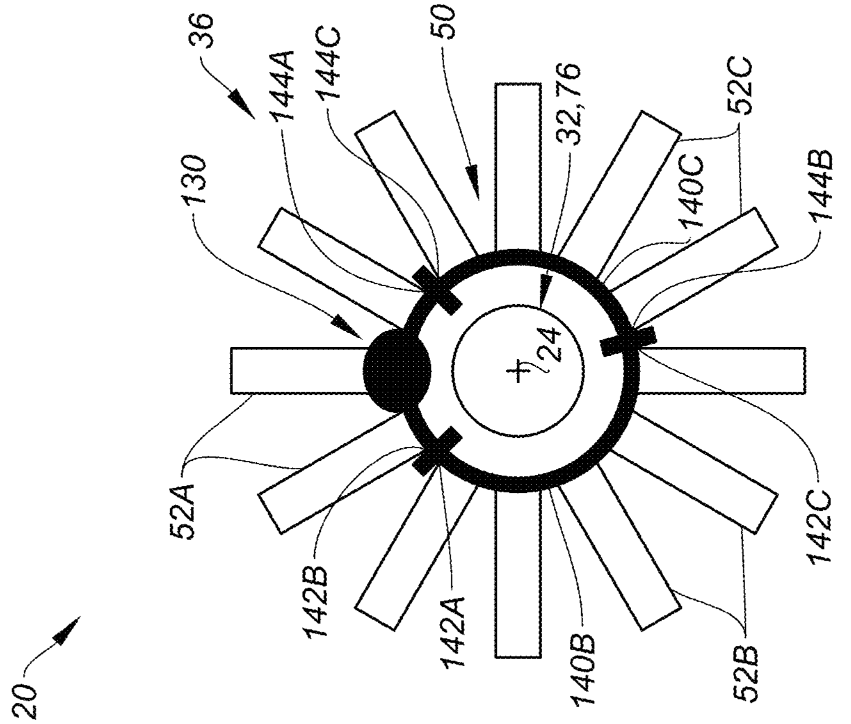

In some embodiments, referring to FIGS. 9 and 10, the structure base 50 may be circumferentially segmented into a plurality of structure segments 140A-C (generally referred to as "140"). Each of these structure segments 140A-C extends circumferentially about the propulsion system axis 24 and the turbine engine 32 between circumferentially opposing ends 142A-C (generally referred to as "142") and 144A-C (generally referred to as "144") of the respective structure segment 140A-C. Here, the ends 142A and 144A are opposing ends of the first structure segment 140A. The ends 142B and 144B are opposing ends of the second structure segment 140B. The ends 142C and 144C are opposing ends of the third structure segment 140C. Each of the structure segments 140B, 140C, for example, may extend between forty five degrees (45°) and one-hundred and sixty degrees (160°) inclusive about the propulsion system axis 24 between its opposing circumferential ends 142B and 144B, 142C and 144C. More particularly, each structure segment 140B, 140C may extend between sixty degrees (60°) and one-hundred and twenty degrees (120°) inclusive about the propulsion system axis 24 between its opposing circumferential ends 142B and 144B, 142C and 144C. The first structure segment 140A may then extend a remainder of the full three-hundred and sixty degree hoop of the structure base 50 about the propulsion system axis 24 between its opposing circumferential ends 142A and 144A.

The first structure segment 140A of FIG. 9 (e.g., a top structure segment, a fixed structure segment, etc.) may be mounted to, integrated with and/or otherwise connected to the pylon structure 130, for example as described above with respect to FIG. 5 or 6. The other structure segments 140B, 140C of FIG. 9 (e.g., side structure segments, movable structure segments, etc.) are collectively disposed diametrically opposite the first structure segment 140A. At the segment first ends 142A and 142B, the second structure segment 140B is movably attached (e.g., pivotably attached) to the first structure segment 140A. Similarly, at the segment second ends 144A and 144C, the third structure segment 140C is movably attached (e.g., pivotably attached) to the first structure segment 140A. At the second structure second end 144B and at the third structure first end 142C, the structure segments 140B and 140C are removably attached (e.g., mechanically fastened, latched, etc.) to one another at a joint between the second structure segment 140B and the third structure segment 140C. With this arrangement, the second structure segment 140B and/or the third structure segment 140C may each be pivoted or otherwise moved from a stowed position (e.g., see FIG. 9 position for propulsion system operation) to an open position (e.g., see FIG. 10 position for turbine engine maintenance, inspection, replacement, etc.). The opening of the structure sections 140B and/or 140C provide access to the turbine engine 32 and its engine core 76 for maintenance, inspection and/or otherwise. The opening of the structure sections 140B and/or 140C may also provide an opening through which the turbine engine 32 and its engine core 76 and/or other turbine engine components, etc. may also be removed from or installed with the aircraft propulsion system 20.

Each structure segment 140A-C of FIG. 9 is associated with a set of one or more of the guide vanes 52A-C (generally referred to as "52"). Each of the first set guide vanes 52A is connected to and projects radially out from the first structure segment 140A. Each of the second set guide vanes 52B is connected to and projects radially out from the second structure segment 140B. Each of the third set guide vanes 52C is connected to and projects radially out from the third structure segment 140C. Note, while each set of the guide vanes 52 in FIG. 9 is shown with a different number of the guide vanes 52, it is contemplated any two or more of the guide vane sets may alternatively be configured with a common number of the guide vanes 52.

Figure 11B:
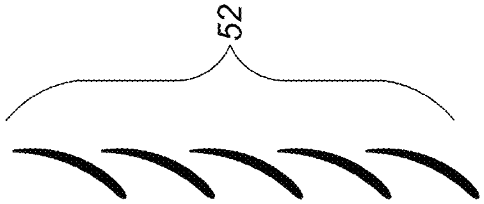
FIGS. 11A and 11B are plan view illustrations of guide vanes in various pitch positions.
Figure 11A:
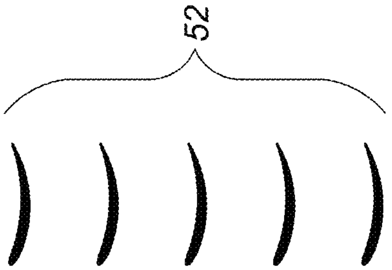

In some embodiments, referring to FIGS. 11A and 11B, some or all of the guide vanes 52 may each be pivotable between a feather position (see FIG. 11A) and an access position (e.g., see FIG. 11B). Between the feather position of FIG. 11A and the access position of FIG. 11B, each respective guide vane 52 may pivot at least or more than sixty degrees (60°) or seventy degrees (70°); e.g., between seventy-five degrees (75°) and eighty-five degrees (85°), inclusive. By pivoting the respective guide vanes 52 to the access position of FIG. 11B, these guide vanes 52 may be positioned to facilitate nesting of the guide vanes 52 while the respective structure segment 140B, 140C (see FIGS. 9 and 10) is opened. Of course, in other embodiments, it is contemplated the structure segment(s) 140B, 140C (see FIGS. 9 and 10) may be opened without pivoting the respective guide vanes 52 to a particular position. In still other embodiments, it is contemplated one or more of the respective guide vanes 52 may be removed to provide additional room for opening the structure segment(s) 140B, 140C (see FIGS. 9 and 10).

Figure 3:
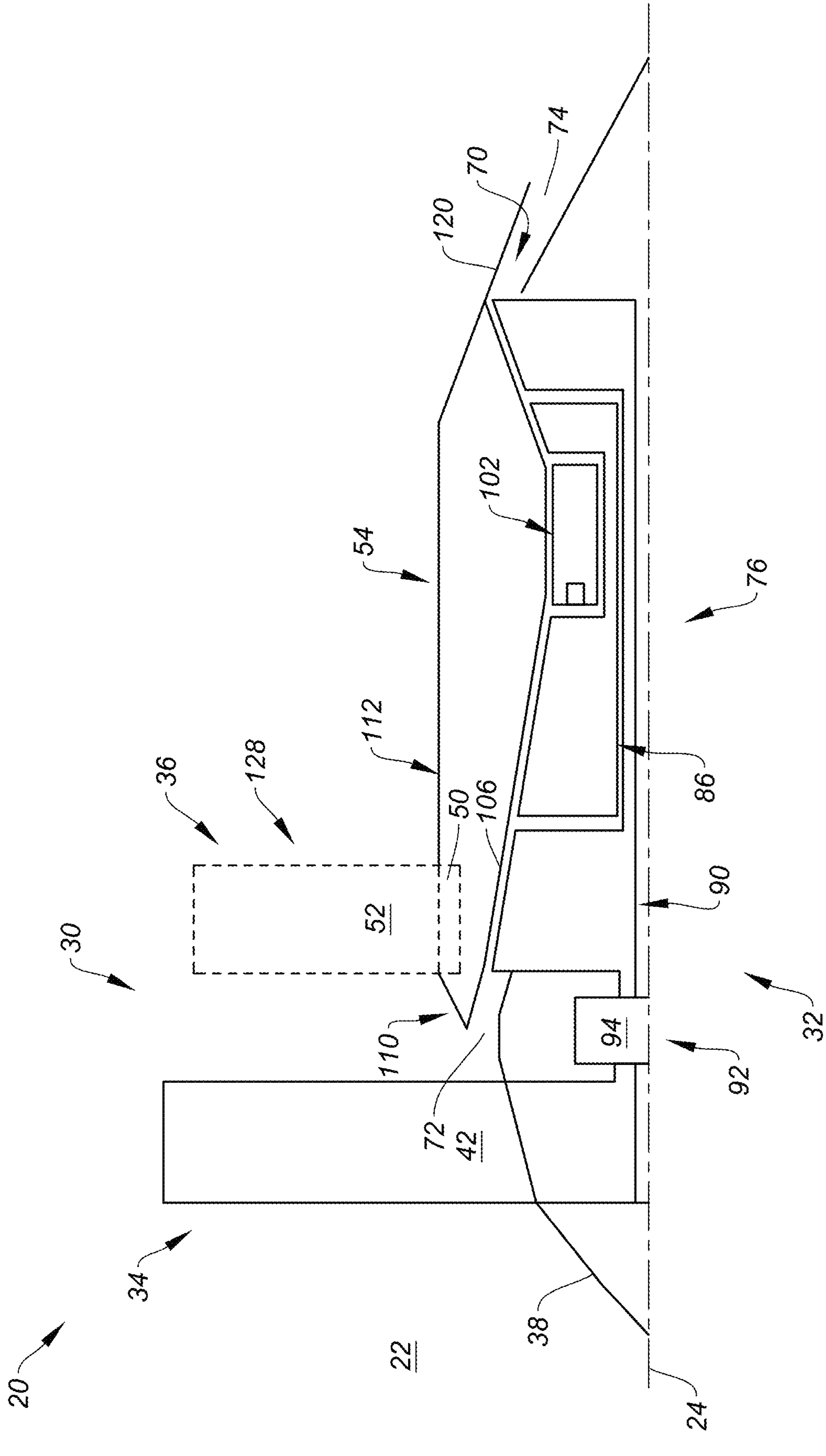
FIGS. 3 and 4 are partial schematic sectional illustrations of the aircraft propulsion system with various modular arrangements.
Figure 4:
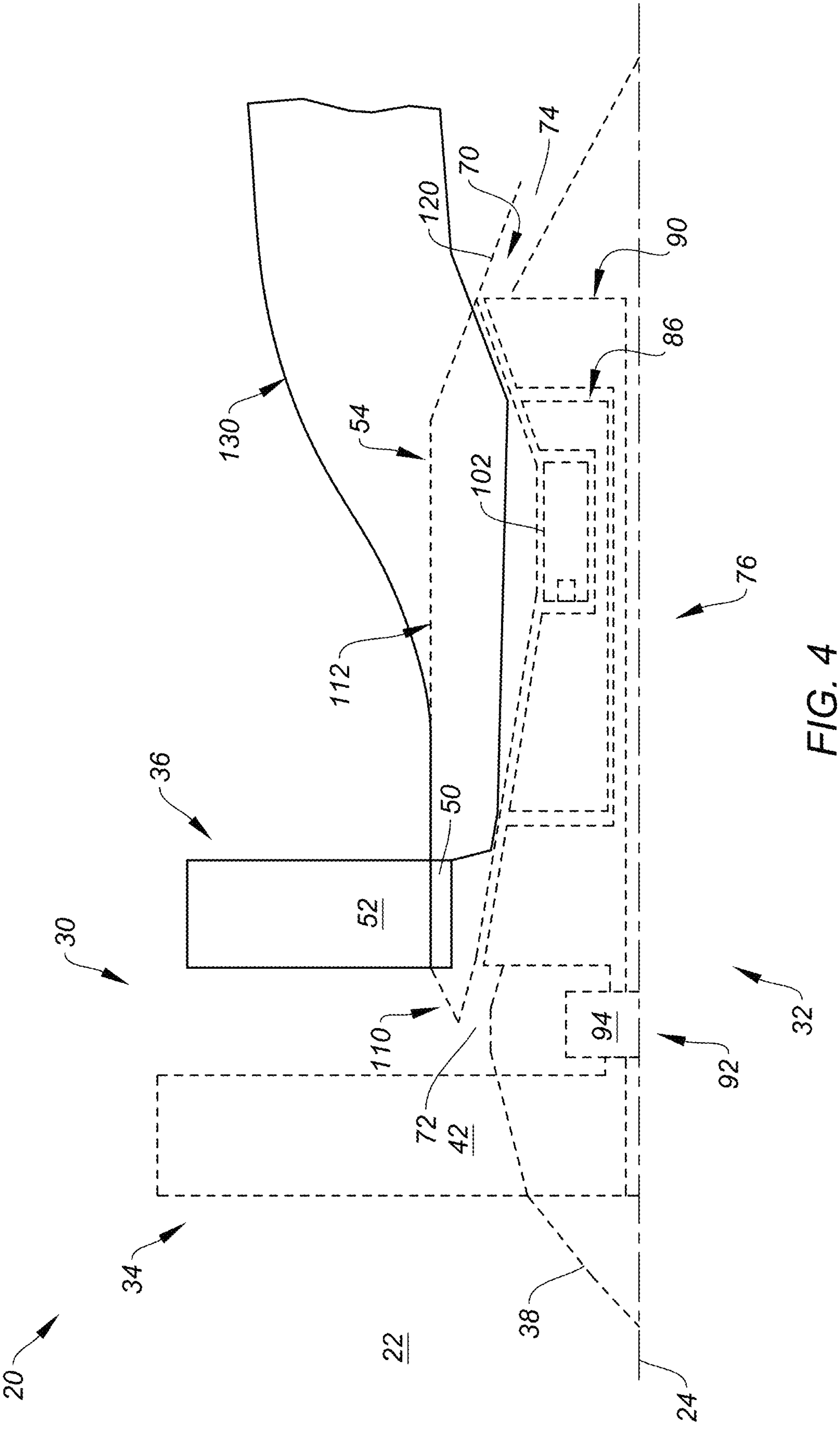

In some embodiments, referring to FIGS. 2 and 3, the vane actuation system 62 may be configured as part of the guide vane structure module 128. However, it is also contemplated the vane actuation system 62 may alternatively be installed independent of the guide vane structure 36.

Figure 12:
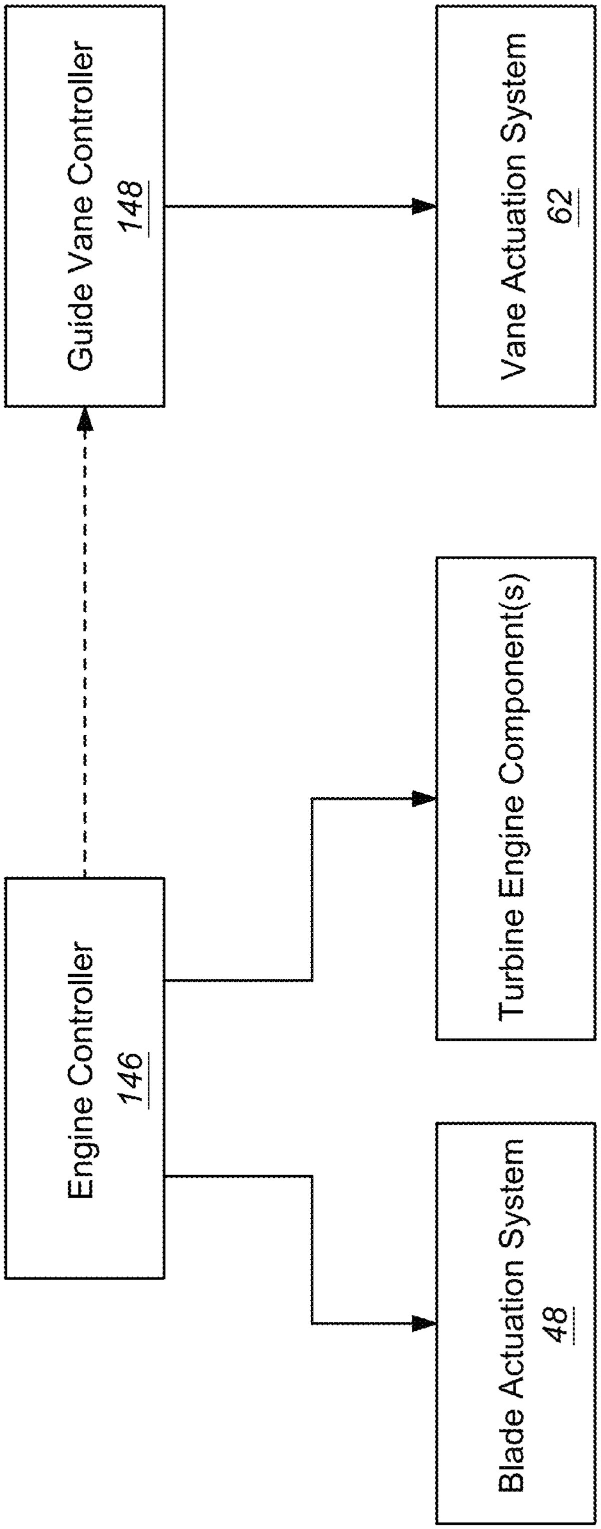
FIG. 12 is a schematic illustration of aircraft propulsion system members controlled by multiple controllers.

In some embodiments, referring to FIG. 12, the aircraft propulsion system 20 may be configured with multiple discrete controllers such as an onboard engine controller 146 and a guide vane controller 148. Examples of the engine controller 146 include, but are not limited to, an electronic engine controller (EEC), an electronic control unit (ECU), a full-authority digital engine controller (FADEC), etc. This engine controller 146 is configured to control and/or monitor operation of various turbine engine component(s) as well as various other propulsion system members including the blade actuation system 48. By contrast, the guide vane controller 148 is configured to control operation of the vane actuation system 62. While this guide vane controller 148 is physically discrete from the engine controller 146 and may (or may not) be located remote from the engine controller 146, the guide vane controller 148 may be in signal communication with (e.g., hardwired and/or wirelessly coupled to) the engine controller 146 to coordinate operation of the various propulsion system members (e.g., 48 and 62 of FIG. 2). Of course, in other embodiments, it is contemplated the single engine controller 146 may also (e.g., directly) control operation of the vane actuation system 62.

Figure 14:
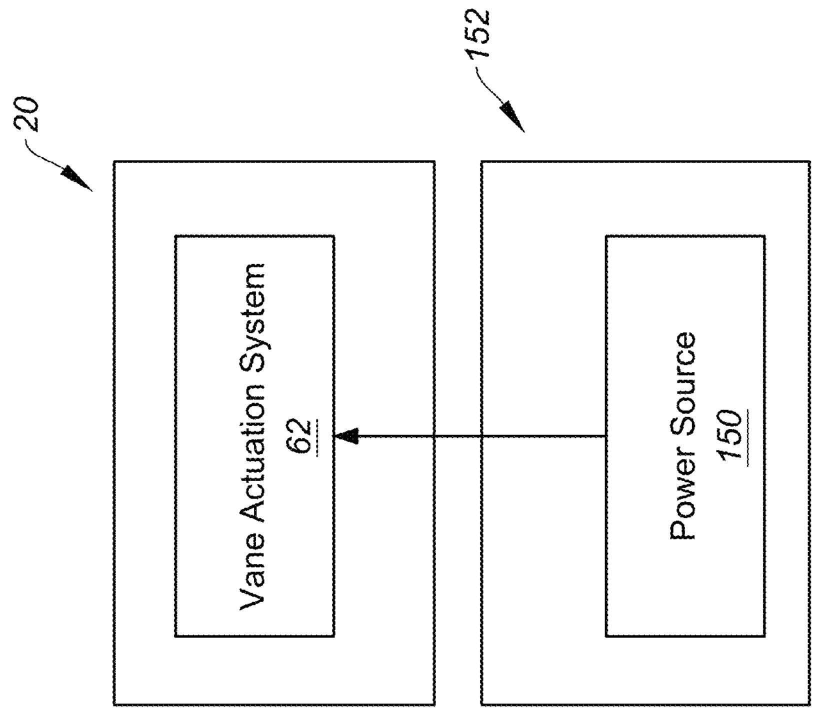
FIGS. 13 and 14 are schematic illustrations of a vane actuation system with various power source arrangements.
Figure 13:
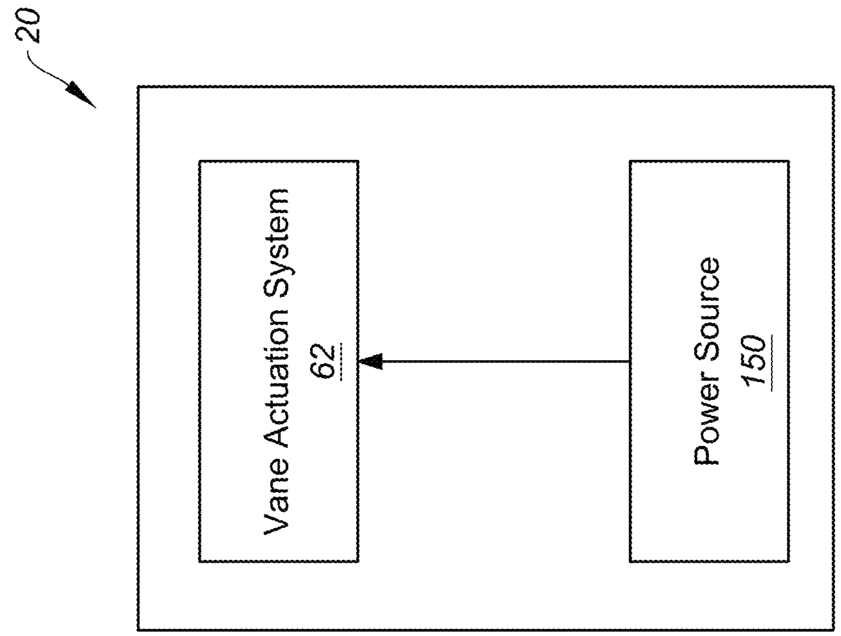

In some embodiments, referring to FIG. 13, the vane actuation system 62 may be powered by a power source 150 onboard the aircraft propulsion system 20. The vane actuation system 62, for example, may be electrically powered by a generator and/or electrical power bus onboard the aircraft propulsion system 20. In another example, the vane actuation system 62 may be pneumatically powered by an air system (e.g., a bleed system) onboard the aircraft propulsion system 20. In still another example, the vane actuation system 62 may be fluidly powered (e.g., hydraulically powered) by a fluid system onboard the aircraft propulsion system 20. Here, a working fluid for the fluid system may be lubricant, coolant, fuel, or the like. In other embodiments, referring to FIG. 14, the power source 150 may be remote from the aircraft propulsion system 20. The power source 150 of FIG. 14, for example, may be arranged in at least one member 152 of an airframe of the aircraft; e.g., in an aircraft fuselage, in an aircraft wing and/or in the pylon structure 130.

Figure 15:
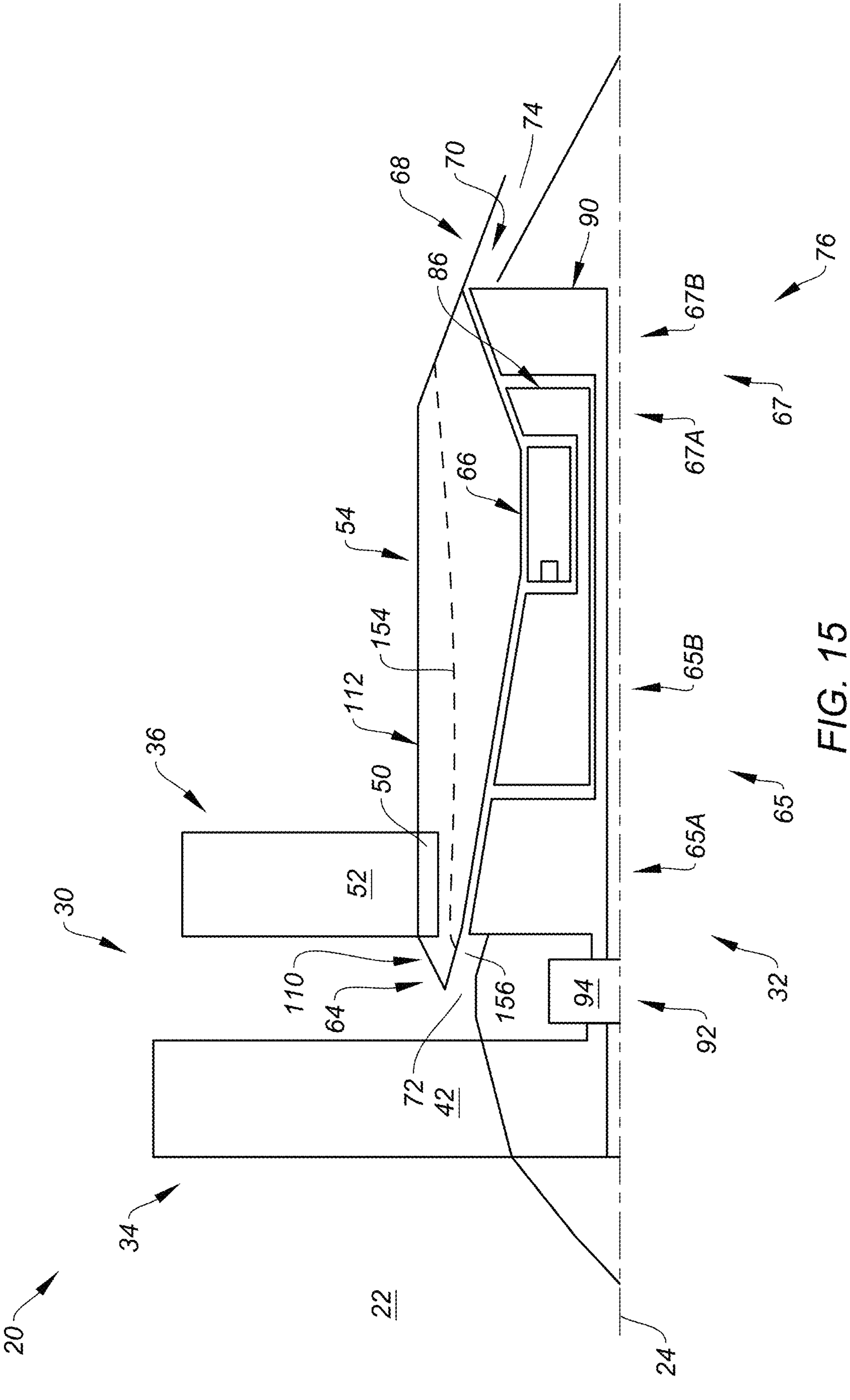
FIG. 15 is a partial schematic sectional illustration of the aircraft propulsion system with a bypass flowpath.

In some embodiments, referring to FIG. 1, the aircraft propulsion system 20 may include a single (e.g., major) internal flowpath; e.g., the engine flowpath 70. In other embodiments, referring to FIG. 15, the aircraft propulsion system 20 may alternatively include multiple (e.g., major) internal flowpaths. The engine flowpath 70 of FIG. 15, for example, is configured as a core flowpath of the turbine engine 32, and the turbine engine 32 also includes a (e.g., annular or non-annular) bypass flowpath 154. Here, the bypass flowpath 154 may split off or otherwise bleed gas from the engine flowpath 70 at an intersection location 156. This intersection location 156 is downstream of the flowpath inlet 72 and upstream of any one or more of the engine section(s) 65A-68. The intersection location 156 of FIG. 15, for example, is disposed longitudinally along the engine flowpath 70 upstream of (or along) the compressor section 65. From this intersection location 156, the bypass flowpath 154 then extends around the engine section(s) (e.g., 65A-68) to bypass those engine sections(s) (e.g., 65A-68).

Figure 16:
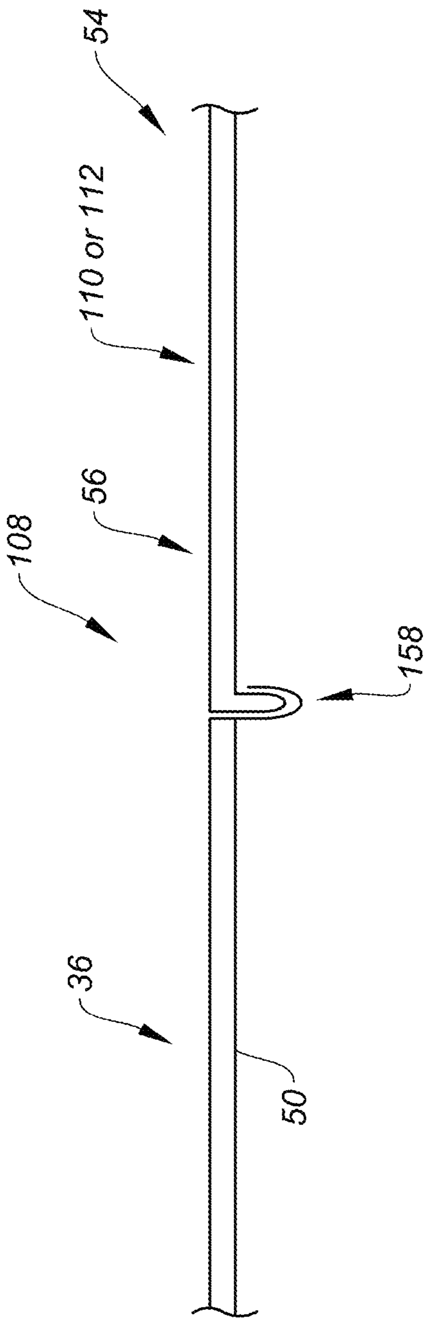
FIG. 16 is a sectional illustration at a joint between a nacelle member and the guide vane structure base.

In some embodiments, referring to FIG. 16, one or more members (e.g., 50 and 110, 50 and 112) of the nacelle 108 may meet the structure base 50 at a joint therebetween. This joint may include a V-groove coupling 158 or another type of coupling to facilitate substantially synchronous movement (e.g., shifting) between the propulsion system members during aircraft flight and to minimize the steps and gaps along the exterior flow boundary 56. Here, the structure base 50 may be substantially structurally independent of the other member 110, 112. However, the V-groove coupling 158 may facilitate positioning between the structure base 50 and the other member 110, 112.

The engine flowpath 70 of FIG. 1 extends longitudinally from the flowpath inlet 72, sequentially through the inlet section 64, the LPC section 65A, the HPC section 65B, the combustor section 66, the HPT section 67A, the LPT section 67B and the exhaust section 68, to the flowpath exhaust 74. The engine flowpath 70 of FIG. 1 is configured such that the core air and the combustion products generally flow in the aft, downstream direction towards the propulsion system aft end 28. The core air and the combustion products thereby flow along with the ambient air propelled by the rotating propulsor rotor 34 in a common axial direction—the downstream, aft direction. The turbine engine 32 of the present disclosure, however, is not limited to such an exemplary common flow engine arrangement. For example, the engine flowpath 70 may alternatively be configured such that the core air and the combustion products generally flow in a forward, upstream direction towards the propulsion system forward end 26. The core air and the combustion products may thereby flow in an opposite direction as the ambient air propelled by the rotating propulsor rotor 34. Here, the turbine engine 32 may have a reverse flow engine arrangement.

The propulsion section 30 of FIG. 1 is described above with a tractor configuration; e.g., where the propulsor rotor 34 is disposed at or otherwise near the propulsion system forward end 26. It is contemplated, however, the propulsion section 30 may alternatively be disposed at or otherwise near the propulsion system aft end 28 to provide a pusher fan configuration. Moreover, while the turbine engine 32 is described above with a particular two rotating structure arrangement, the present disclosure is not limited thereto. For example, the LPC rotor 78 may be omitted to configure the LPT rotor 81 as a power turbine (PT) rotor for the propulsor rotor 34. In another example, the turbine engine 32 may also include another rotating structure; e.g., an intermediate speed spool for the engine core 76.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

an open propulsor rotor comprising a plurality of open propulsor blades arranged circumferentially around an axis, each of the plurality of open propulsor blades projecting radially out into an environment external to the aircraft propulsion system;

a housing structure including an engine case, a nacelle structure and a receptacle, the nacelle structure disposed radially outboard of and partially covering the engine case, the nacelle structure forming a first axial section of an exterior flow boundary for the aircraft propulsion system that borders the environment external to the aircraft propulsion system, the receptacle disposed radially outboard of the engine case and axially between the open propulsor rotor and the nacelle structure, and the receptacle configured to receive a structure base of an open guide vane structure;

a compressor section housed within the engine case;

a combustor section housed within the engine case;

a turbine section housed within the engine case, the turbine section comprising a turbine rotor operatively coupled to the open propulsor rotor, and the turbine rotor configured to drive rotation of the open propulsor rotor about the axis; and a flowpath extending through the compressor section, the combustor section and the turbine section from an inlet into the flowpath to an exhaust from the flowpath.

2. The assembly of claim 1, wherein the housing structure further includes an inlet structure;

an inner portion of the inlet structure forms an outer peripheral boundary of the inlet into the flowpath; and an outer portion of the inlet structure forms a second axial section of the exterior flow boundary with the receptacle extending axially between the first axial section of the exterior flow boundary and the second axial section of the exterior flow boundary.

3. The assembly of claim 2, further comprising the structure base, wherein the structure base is configured to form a third axial section of the exterior flow boundary flush with and axially adjacent to the second axial section of the exterior flow boundary.

4. The assembly of claim 1, further comprising:

a pylon structure; and the engine case mounted to the pylon structure through a load path independent of the receptacle.

5. The assembly of claim 1, further comprising:

the open guide vane structure including the structure base and a plurality of open guide vanes;

each of the plurality of open guide vanes projecting radially out from a portion of the structure base into the environment external to the aircraft propulsion system, the portion of the structure base comprising a second axial section that is flush with and axially adjacent to the first axial section of the exterior flow boundary.

6. The assembly of claim 5, further comprising:

a pylon structure; and a turbine engine including the compressor section, the combustor section, the turbine section, the flowpath and the engine case;

the open guide vane structure mounted to the pylon structure independent of the turbine engine.

7. The assembly of claim 5, further comprising:

a pylon structure; and a turbine engine including the compressor section, the combustor section, the turbine section, the flowpath and the engine case;

the turbine engine mounted to the pylon structure independent of the open guide vane structure.

8. The assembly of claim 1, further comprising:

a pylon structure comprising at least a portion of the structure base; and a turbine engine including the compressor section, the combustor section, the turbine section, the flowpath and the engine case, the turbine engine mounted to the pylon structure.

9. The assembly of claim 1, further comprising the open guide vane structure, and the open guide vane structure comprising:

the structure base disposed in the receptacle, and the structure base comprising a first structure segment and a second structure segment;

the first structure segment extending circumferentially about the axis between a first segment first end and a first segment second end; and the second structure segment extending circumferentially about the axis between a second segment first end and a second segment second end, the second segment first end next to the first segment first end, the second segment second end next to the first segment second end, and the second structure segment removably attached to the first structure segment;

one or more first open guide vanes arranged circumferentially about the axis, each of the one or more first open guide vanes connected to and projecting radially out from the first structure segment; and one or more second open guide vanes arranged circumferentially about the axis, each of the one or more second open guide vanes connected to and projecting radially out from the second structure segment.

10. The assembly of claim 9, further comprising a pylon structure connected to the first structure segment.

11. The assembly of claim 9, wherein the second structure segment extends between ninety degrees and three-hundred degrees circumferentially about the axis between the second segment first end and the second segment second end.

12. The assembly of claim 1, further comprising the open guide vane structure, and the open guide vane structure including:

the structure base disposed in the receptacle, the structure base including a first structure segment and a second structure segment, the first structure segment extending circumferentially about the axis to a first segment first end, the second structure segment extending circumferentially about the axis, and the second structure segment pivotally attached to the first structure segment at the first segment first end;

one or more first open guide vanes arranged circumferentially about the axis, each of the one or more first open guide vanes connected to and projecting radially out from the first structure segment; and one or more second open guide vanes arranged circumferentially about the axis, each of the one or more second open guide vanes connected to and projecting radially out from the second structure segment.

13. The assembly of claim 12, wherein the open guide vane structure further includes one or more third open guide vanes arranged circumferentially about the axis, each of the one or more third open guide vanes is connected to and projects radially out from a third structure segment; and the first structure segment extends circumferentially about the axis between the first segment first end and a first segment second end, the structure base further includes the third structure segment, the third structure segment extends circumferentially about the axis, and the third structure segment is pivotally attached to the first structure segment at the first segment second end.

14. The assembly of claim 13, wherein the third structure segment is removably attached to the second structure segment at a joint between the third structure segment and the second structure segment.

15. The assembly of claim 12, wherein the one or more first open guide vanes comprise a first open guide vane pivotable about a first pivot axis, and the first open guide vane is configured to pivot to a first access position to facilitate opening of the second structure segment from a stowed position to an open position; and the one or more second open guide vanes comprise a second open guide vane pivotable about a second pivot axis and circumferentially neighboring the first open guide vane, and the second open guide vane is configured to pivot to a second access position to facilitate opening of the second structure segment from the stowed position to the open position.

16. The assembly of claim 1, further comprising:

a turbine engine including the compressor section, the combustor section, the turbine section and the flowpath;

an engine controller configured to control operation of the turbine engine;

the open guide vane structure including the structure base and a plurality of open guide vanes arranged circumferentially about the axis, each of the plurality of open guide vanes projecting radially out from the structure base into the environment external to the aircraft propulsion system;

a vane actuation system configured to change pitch of one or more of the plurality of open guide vanes; and a second controller configured to control operation of the vane actuation system, the second controller discrete from the engine controller.

17. The assembly of claim 1, wherein the flowpath is a core flowpath, and the assembly further comprises:

a bypass flowpath splitting off from the core flowpath at a location between the inlet into the core flowpath and the combustor section, the bypass flowpath bypassing at least the combustor section and the turbine section.

* * * * *